Figure 1:
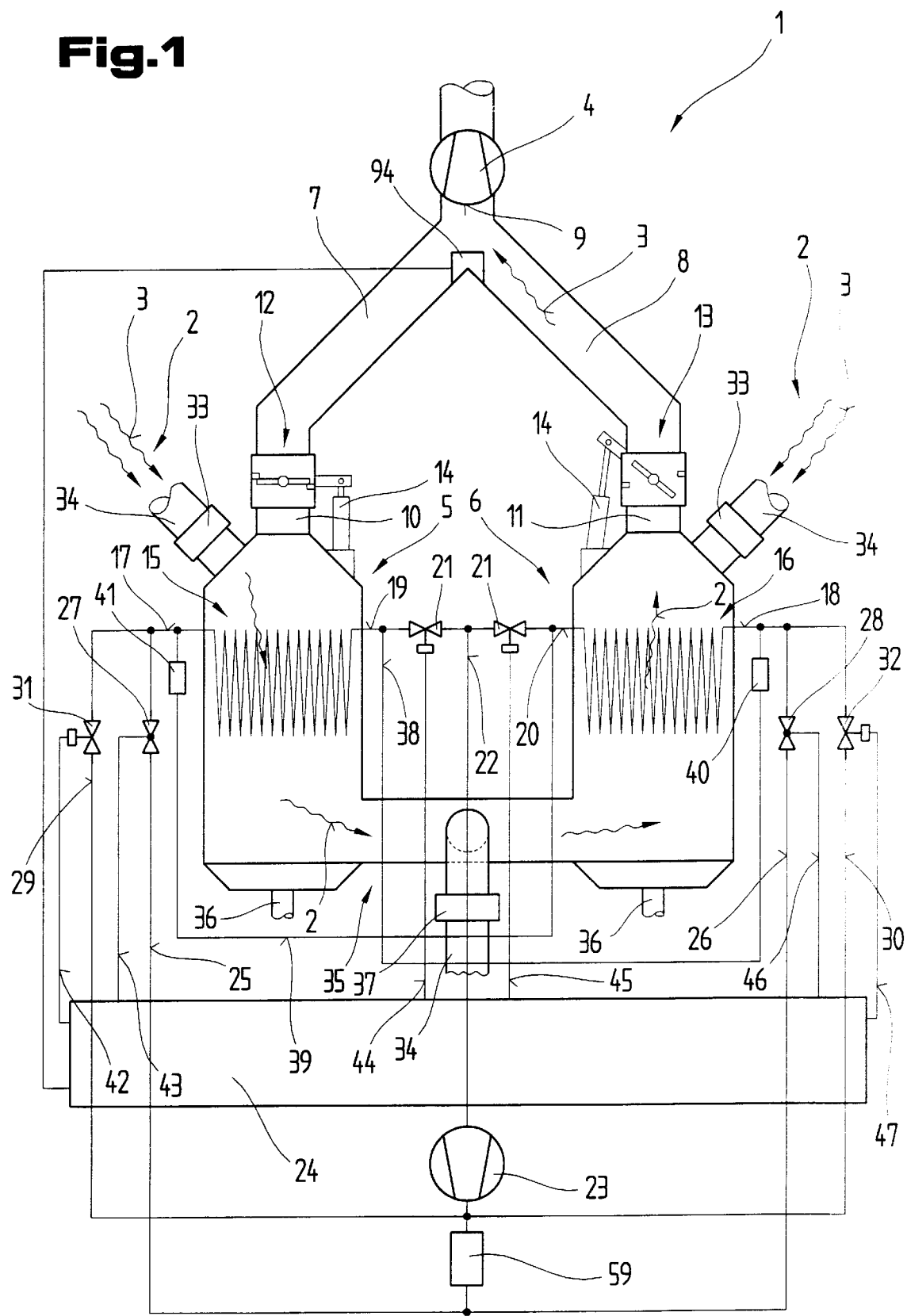

United States Patent [19]
Gossler

[11] Patent Number: 5,865,033
[45] Date of Patent: Feb. 2, 1999

[54] METHOD AND DEVICE FOR COOLING GASES

[76] Inventor: Ewald Gossler, Hauptstrasse 3, A-4813 Altmünster, Austria

[21] Appl. No.: 809,518
[22] PCT Filed: Sep. 27, 1995
[86] PCT No.: PCT/AT95/00187
  § 371 Date: Mar. 24, 1997
  § 102(e) Date: Mar. 24, 1997
[87] PCT Pub. No.: WO96/10156
  PCT Pub. Date: Apr. 4, 1996

[30] Foreign Application Priority Data

Sep. 29, 1994 [AT] Austria ..................... 1865/94

[51] Int. Cl.⁶ .................. F25B 41/00; F25B 47/00
[52] U.S. Cl. ...................... 62/81; 62/93; 62/278
[58] Field of Search ................... 62/81, 80, 93, 62/271, 277, 278

[56] References Cited

U.S. PATENT DOCUMENTS

| | | |
|---|---|---|
| 2,763,132 | 9/1956 | Jue . |
| 2,867,988 | 1/1959 | Brandt ........................... 62/93 |
| 3,150,498 | 9/1964 | Blake ............................ 62/81 |
| 3,581,509 | 6/1971 | Manka ........................... 62/5 |
| 4,505,125 | 3/1985 | Baglione ...................... 62/209 |
| 4,523,435 | 6/1985 | Lord ............................. 62/212 |
| 4,905,476 | 3/1990 | Cinacchi ........................ 62/93 |

FOREIGN PATENT DOCUMENTS

| | | |
|---|---|---|
| 958845 | 2/1957 | Germany . |
| 20 06 316 | 9/1970 | Germany . |
| 25 36 398 | 4/1976 | Germany . |
| 26 39 339 | 2/1978 | Germany . |
| 27 34 358 | 2/1978 | Germany . |
| 29 48 520 | 6/1981 | Germany . |
| 205236 | 12/1983 | Germany ................... 62/81 |
| 36 37 071 | 5/1987 | Germany . |
| 40 22 802 | 1/1992 | Germany . |
| 41 35 887 | 5/1993 | Germany . |
| 403005680 | 1/1991 | Japan ...................... 62/81 |
| 234745 | 2/1945 | Switzerland . |

*Primary Examiner*—William Doerrler
*Attorney, Agent, or Firm*—Bell Seltzer Intellectual Property Law Group of Alston & Bird LLP

[57] ABSTRACT

According to a method of cooling gases, in particular air which is drawn in through a compressor, in a compressed air arrangement the gas flows alternately through at least one of a plurality of refrigerating driers (5, 6) equipped with heat exchangers (15, 16). The gas drawn in is cooled by means of a heat exchanger (15, 16) to below 0° C. over a cooling section. Whilst the gas is being cooled, the ice produced in the refrigerating drier (5, 6) is defrosted by at least one of the refrigerating driers (5, 6) or in the further refrigerating drier(s) (5, 6) by the supply of a hot refrigerant vapour. The liquid refrigerant flowing out of the refrigerating drier (5, 6) to be defrosted is introduced into a pressure and/or connection line (17, 18) of the refrigerant circuit between the inlet of the heat exchanger (15, 16) used for cooling the gas drawn in and the condenser (59), which is arranged upstream of this (these) heat exchangers, or the tank. The invention also concerns a further method in which the nominal temperature is higher at the corresponding nominal pressure of the refrigerant emerging from the heat exchanger used for cooling the gas drawn in than the nominal temperature corresponding to the nominal pressure of this refrigerant.

9 Claims, 12 Drawing Sheets

METHOD AND DEVICE FOR COOLING GASES

The invention relates to a method and a device for compressing gases and, more particularly, to methods and devices for cooling compressed gases by circulating a refrigerant through heat exchangers over which the gases flow.

A method and a device for compressing gases is already known—according to DE-A1-36 37 071—, in which the gas drawn in through the compressor is previously cooled by a refrigerating drier in a cooling section to below 0° C. The air drawn in by the compressor is in this case suctioned alternatively by one of two parallel connected refrigerating driers. Whilst the suctioned gas is cooled by one of them, the condensate in the form of ice which is produced on cooling the suctioned gas is removed by the other. For this instead of an overcooled refrigerant hot, gaseous refrigerant is supplied to the refrigerating drier to be defrosted, which flows through the heat exchanger arranged in the said refrigerating drier and heats it, so that the ice adhering to the heat exchanger and refrigerating drier defrosts. If the refrigerant flowing out of the heat exchanger is established to be of a temperature in the region of more than +0° C., the supply of hot refrigerant to the heat exchanger is interrupted and expanded, cold refrigerant flows through the heat exchanger again, which leads to a pre-cooling of the heat exchanger. If a desired minimum operating temperature of the heat exchanger is reached, for example −10° C., the air required by the compressor can be suctioned through the pre-cooled heat exchanger again, whereupon the other heat exchanger is defrosted. By means of the alternate cooling and defrosting of the two heat exchangers a continual drawing in of overcooled gas for the compressor is possible, and also by means of pre-cooling any damage that might be caused by ice particles drawn in with the suctioned air can be avoided in the compressor. The cooled refrigerant exiting from the outlet of the heat exchanger on defrosting is guided through lines to a liquid gas tank arranged directly downstream of the condenser arranged after the refrigerant compressor, and is mixed there with the previously cooled refrigerant. By means of the return of the refrigerant exiting from the heat exchanger to be defrosted into the liquid gas tank the effectiveness of such methods and devices is not always satisfactory.

The objective of the present invention is to improve the overall effectiveness of a method and a device for producing dried compressed air.

The problem of the invention is solved by passing liquid refrigerant flowing out of the heat exchanger being defrosted into the pressure line or connection line of the refrigerant circuit. The advantage of this solution is that the refrigerant exiting the heat exchanger of the refrigerating drier to be defrosted is fed into the refrigerant line directly before the heat exchanger of the other refrigerating drier overcooling the suctioned air, so that heat is drawn from the environment by means of the gasification of the refrigerant exiting the heat exchanger to be defrosted in liquid form, determined by the fall in pressure and the energy required to convert the refrigerant from the liquid to the gaseous state, so that the refrigerant used previously to defrost the heat exchanger to be defrosted can now be used at least partly to cool the gas drawn in by the compressor. The exact regulation of the suction temperature of the gas drawn in though the compressor can be controlled by the expansion valve arranged upstream of the heat exchanger used to overcool the gas, whereby in a surprising manner the pressure and temperature conditions in the refrigerant, which change during the cooling process in the heat exchanger, can be balanced out by the already available control.

This problem of the invention can however also be solved independently hereof by feeding the liquid refrigerant emerging from the heat exchanger being defrosted into the supply line between the expansion valve and the heat exchanger being used to cool the gas. The advantage of this solution is that a so-called overheating of the refrigerant vapour is achieved, i.e. the difference between the temperature at which the refrigerant condenses and passes from the gaseous into the liquid phase is exceeded by several degrees, so that even with unforeseen cooling on passing through the line system in the region of the suction line no change in state can occur, in particular no sudden change in state, in order to prevent liquid refrigerant from being drawn into the suction line of the refrigerant compressor. In this way a much higher degree of operational reliability is achieved by such a method and the arrangements are prevented from getting damaged.

It is achieved advantageously by means of the further development of measuring the actual temperature or pressure of the gas or the refrigerant entering the heat exchanger being used to cool the gas and comparing the actual temperature or pressure with a predetermined nominal temperature or pressure, and adjusting the amount of refrigerant flowing through the expansion valve to the heat exchanger is controlled to drive the actual temperature or pressure toward the predetermined nominal temperature or pressure. In this way, not only the heat output in the heat exchanger is controlled but at the same time the maintenance of a desired degree of overheating of the refrigerant can also be monitored.

Advantageously, the amount of refrigerant flowing through the expansion valve is increased if the actual temperature of the suctioned gas is too low. In this way, it is ensured that this level of refrigerant overheating can also be maintained during operation.

Advantageously, the refrigerant emerging from the defrosting heat exchanger between the expansion valve and the cooling heat exchanger is mixed with the expanded gaseous refrigerant, and thereby an improved energy balance on overcooling the suctioned air can be achieved and thus more energy can be saved as the heat removed from the refrigerant necessary for condensing can be used to defrost the heat exchanger or heat exchangers not in operation.

In accordance with yet another method of the invention, the pressure of the refrigerant in the return line leading from the defrosting heat exchanger to the Venturi valve is greater than the pressure of refrigerant in a connection line which feeds refrigerant into the cooling heat exchanger. This is advantageous in that the introduction of the amount of refrigerant emerging from the heat exchanger to be defrosted requires no additional regulation or control and thus a further loss of pressure and thus a loss of energy is excluded.

Preferably, the amount of hot liquid refrigerant fed into a bypass line for defrosting heat exchangers is less than 50 percent of the entire conveyed output of the refrigerant compressor, as thereby the amount of liquefied refrigerant emerging from the heat exchanger or heat exchangers to be defrosted is equal to or less than the amount of refrigerant regulated by the expansion valve and cooled by the condenser, and thus by controlling the expansion valve despite the use of the amount of refrigerant supplied without regulation by the heat exchangers to be defrosted a definite control and regulation of the temperature to be cooled is possible.

An unproblematical mixing of the refrigerant supplied by the heat exchanger to be defrosted can be achieved by feeding the refrigerant emerging from the defrosting heat exchanger between the condenser and the expansion valve into the pressure line.

A refined control of the heat transfer in the heat exchanger can be achieved by feeding the refrigerant from the defrosting heat exchanger into the pressure line in a region thereof in which the pressure of the liquid refrigerant is equal to or smaller than that of the refrigerant emerging from the defrosting heat exchanger.

An exact regulation of the temperature of the gas suctioned by the compressor which is to be compressed can however also be achieved by feeding the refrigerant emerging from the defrosting heat exchanger into the low-pressure region of a Venturi valve disposed in a line between the condenser to the expansion valve of the cooling heat exchanger, whereby changing pressure and temperature conditions owing to the continuous defrosting process in the heat exchanger to be defrosted do not make more difficult the delivery of this amount of refrigerant into the circuit for cooling the heat exchanger in order to cool the suctioned gas.

A surprising additional advantage is also provided by drawing the gas to be cooled through two heat exchangers arranged one behind the other, as thereby the degree of ice formation on the heat exchanger arranged in the cooling zone is reduced and thus a change-over between the parallel suction paths need not be made as often, whereby because of the lower energy requirement on defrosting greater economy can be achieved. In addition, because of the division into a climatic zone and a cooling zone, in the climatic zone the surfaces of the heat exchangers are wet from the precipitation of condensate removed from the gas and because of these wet surfaces the heat exchangers can be used as particle filters, in particular dirt filters, whereby dirt is removed regularly from the heat exchanger with the outflow of condensate during continuous operation.

By means of cooling the gas entering the forward heat exchanger which comprises a cooling zone from a temperature of +20° C. to a temperature of equal to or greater than −10° C., and cooling the gas in the rear heat exchanger which comprises a climatic zone to a temperature of below −10° C., a preferred division of the cooling process of the suctioned gas and a preferred removal of the condensate according to the procedure can be achieved. This solution is mainly advantageous in that the removal of water vapour in the climatic zone can be performed using much less energy than if the gas were cooled by a single heat exchanger by a temperature difference of 40°–50°, for example to −40°. By dividing into the climatic and the cooling zone, on using separate refrigerant compressors for each of the two zones with about 10-times the cooling capacity of a single heat exchanger, a 2.5 times increase of power input is all that is required in the refrigerant compressors. In this way, by dividing the cooling of the gas into a climatic and cooling zone a considerable increase in economy is achieved.

Advantageously, the gas in the climatic zone is only cooled to the extent that the precipitating condensate remains liquid, as thereby the separation of particles, in particular dust and dirt, drawn in with the suctioned gas is made simply more possible.

A greater degree of effectiveness on cooling by optimising the pipe length of the refrigerant lines in the heat exchanger can be achieved by guiding the refrigerant in several part flows through the heat exchanger.

An exact method control is possible by providing a separate expansion valve for each of the several part flows as it can be ensured mainly that by means of a sensitive control the refrigerant exits the heat exchanger in a gaseous state.

In a further variation of the method, several refrigerant compressors are assigned to the heat exchangers in the cooling zone and the climatic zone, and therefore the refrigerant compressor can be controlled favourably in terms of the energy balance and greater operational reliability can be achieved.

By means of supplying the heat exchangers of the cooling zone and/or the climatic zone with hot gaseous refrigerant during the defrosting process, even at lower temperatures of the gas drawn in from the environment which is to be compressed, perfect operational reliability and a precise continuous operation of the compressor can be achieved, whereby even at very low suction temperatures or with considerable overcooling of the suctioned gas rapid change between the parallel running suction paths is possible because of the rapid defrosting of the respective iced-up heat exchanger.

The problem of the invention can however also be solved by providing a refrigerant compressor which supplies refrigerant to a condenser, and two heat exchangers each of which is connected via a separate expansion valve to the pressure line of the refrigerant downstream of the condenser. Each heat exchanger is connected via a suction line to a solenoid valve, and a return line is connected to the suction line between the solenoid valve and the heat exchanger and leads via a check valve into the connection line between the other heat exchanger and its associated expansion valve, whereby the device can ensure that the refrigerant flowing out of the heat exchanger in which the gas or the air has been cooled, is heated over the pressure dew point and thus the refrigerant flowing back to the refrigerant compressor is reliably prevented from condensing.

The problem of the invention can however also be solved independently thereof by pressurizing the expansion valve to alter the amount of refrigerant passing through the heat exchanger when the actual temperature or pressure in the suction line leading from the heat exchanger to the refrigerant compressor deviates from a predetermined planned temperature or pressure. The advantage of this solution is that a simple return of the refrigerant condensed in the heat exchanger to be cooled into the circuit provided for cooling the parallel running heat exchanger is possible and thus an increase in effectiveness and a considerable energy saving on compressing gases can be achieved.

By means of providing the suction line of the heat exchanger with a pressure sensor and a temperature sensor, it is possible in a simple way to ensure overheating of the refrigerant exiting from the heat exchanger used for cooling the suctioned gas.

An almost real-time control of the operation of the device can be achieved by connecting the pressure sensor and/or the temperature sensor to the expansion valve.

In an embodiment of the device in which each heat exchanger has several refrigerant lines running parallel to one another, the refrigerant lines between the expansion valve and the suction line all have equal lengths and equal cross sections. In this way, a high degree of operational reliability with little expenditure on technical devices as well as an effective use of the refrigerant energy for overcooling the suctioned gas is achieved.

A sensitive control of the temperature of the suctioned gas and an associated high degree of effectiveness of the entire device can be obtained by providing each refrigerating drier of the cooling zone and the climatic zone with several heat exchangers connected in parallel and fed with a separate expansion valve by a common refrigerant compressor.

In the following the invention is described in more detail with reference to the design variants shown in the examples of embodiments.

Figure 2:
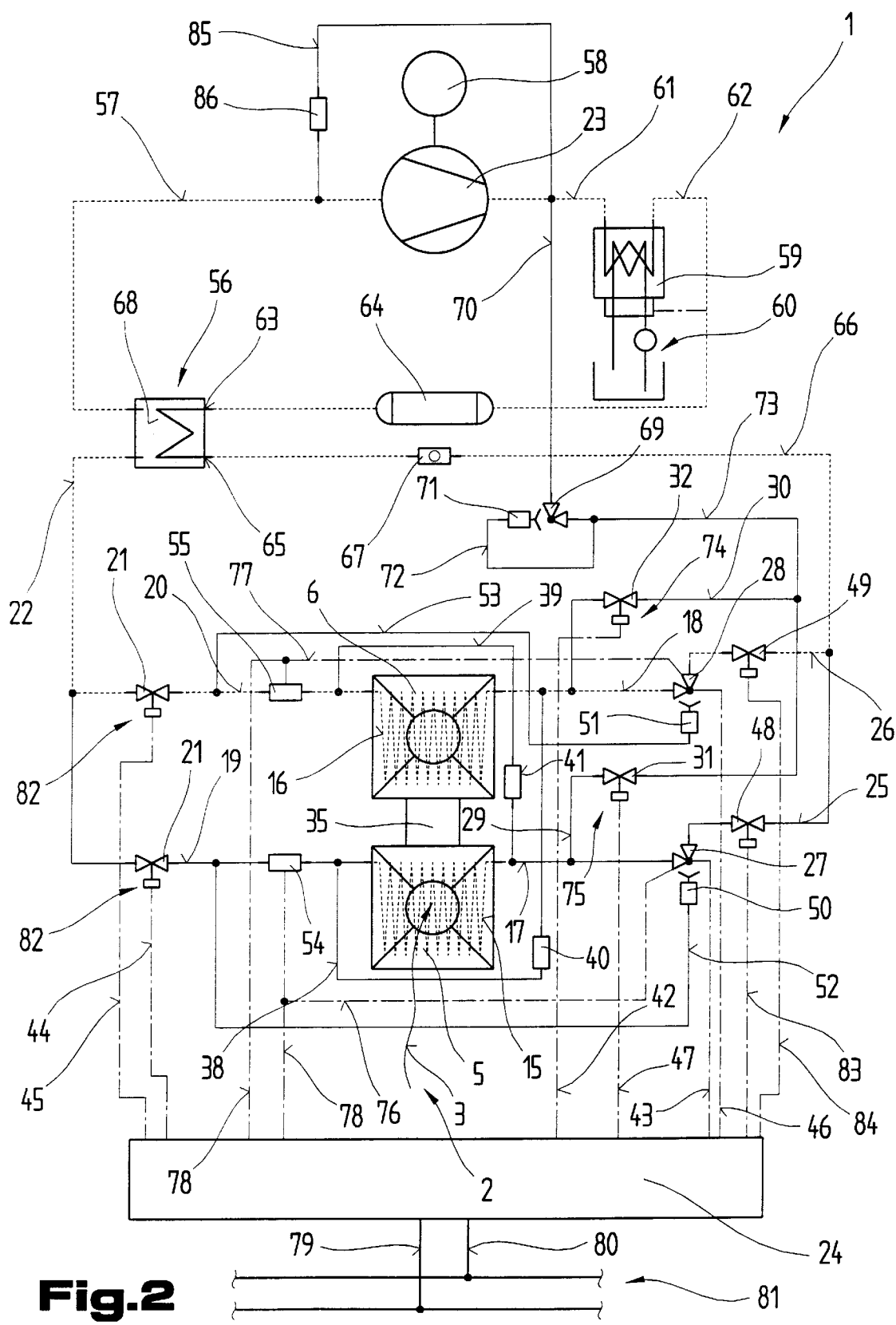
Figure 3:
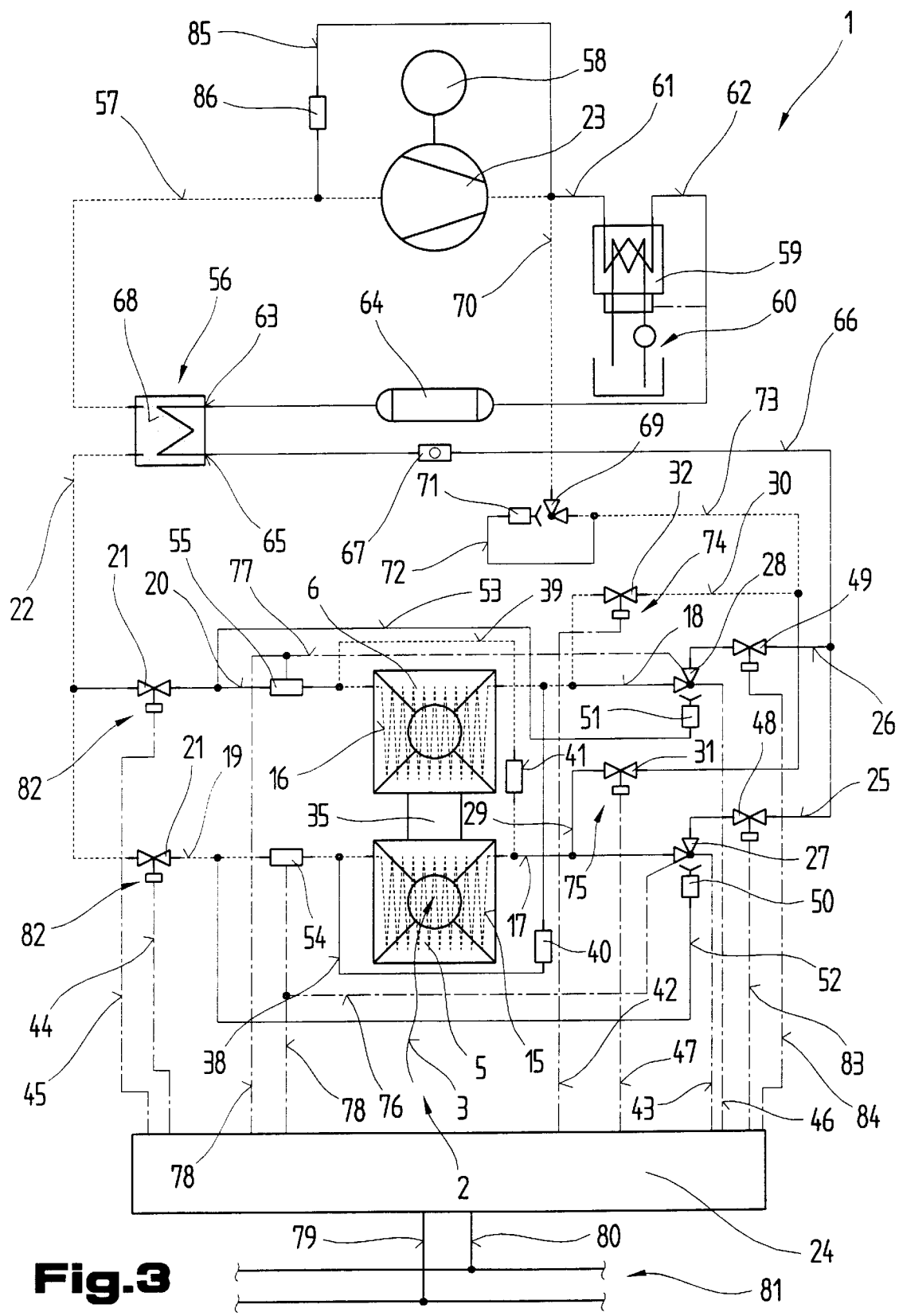
Figure 4:
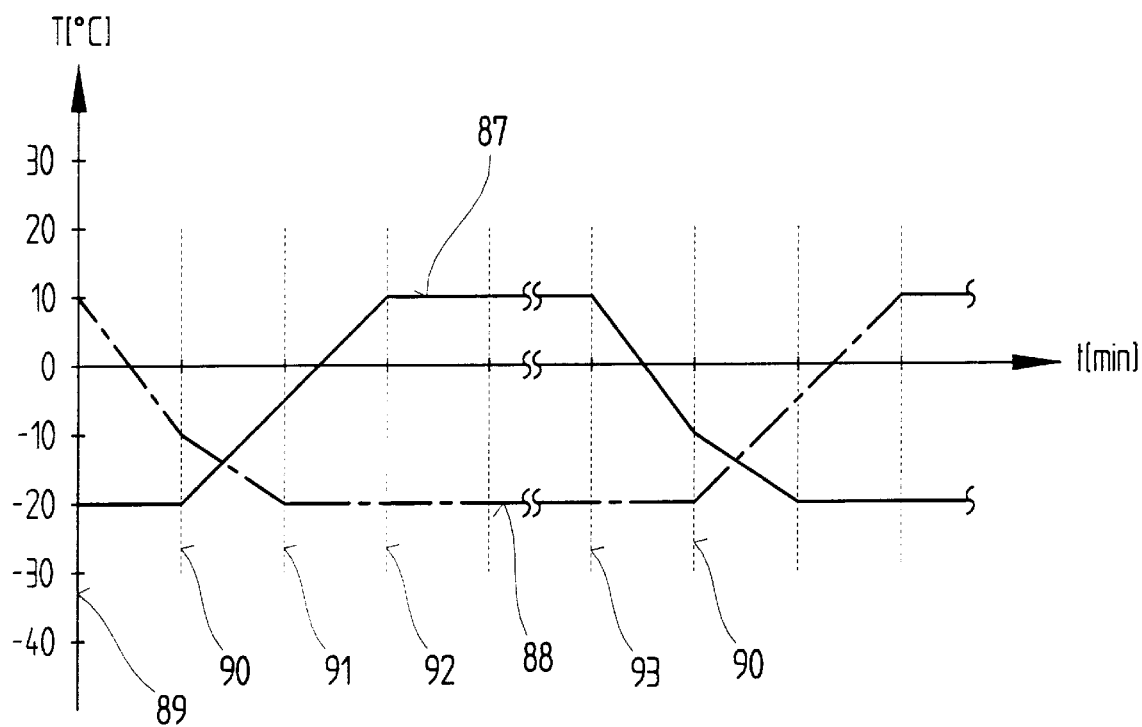
Figure 5:
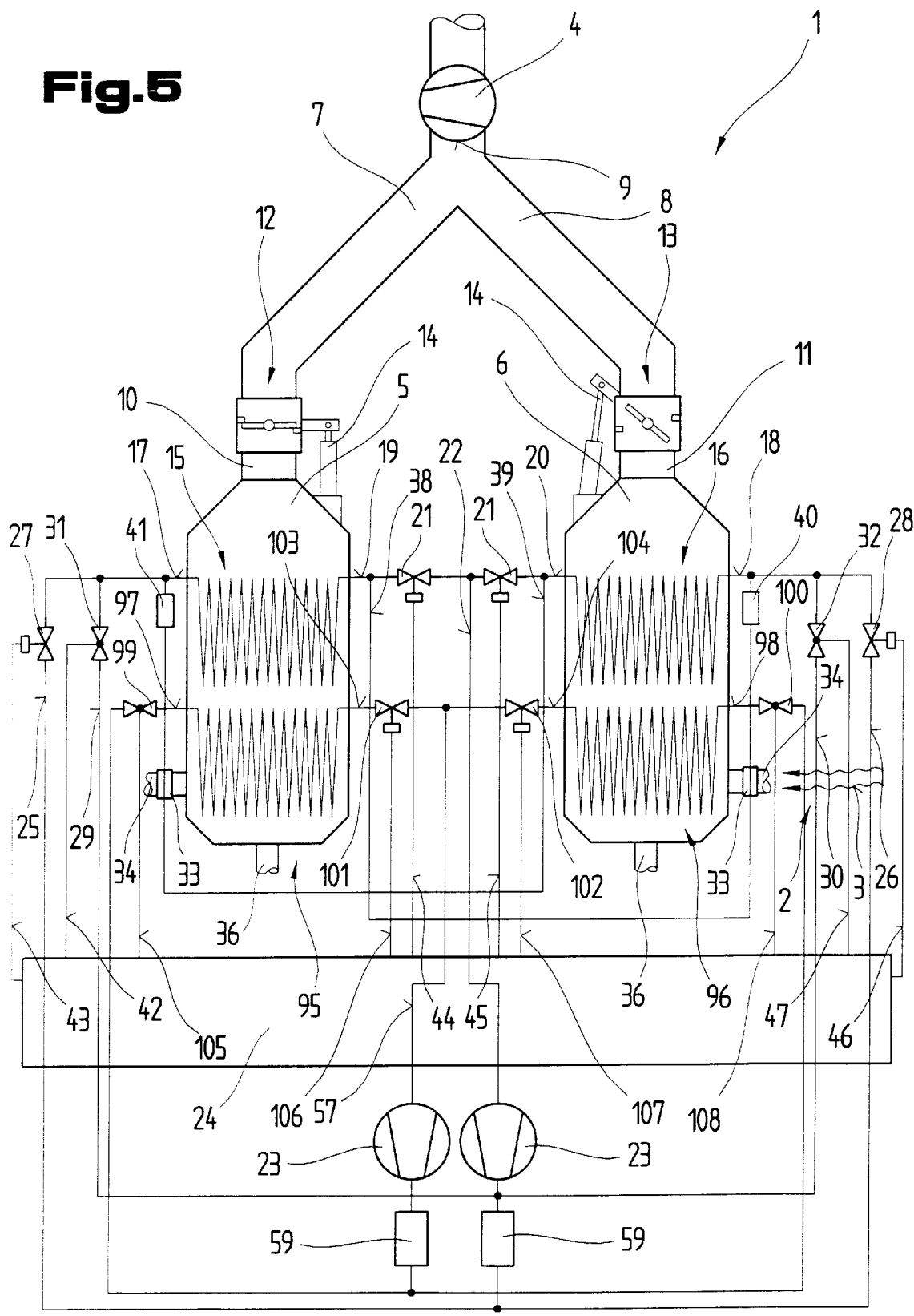
Figure 6:
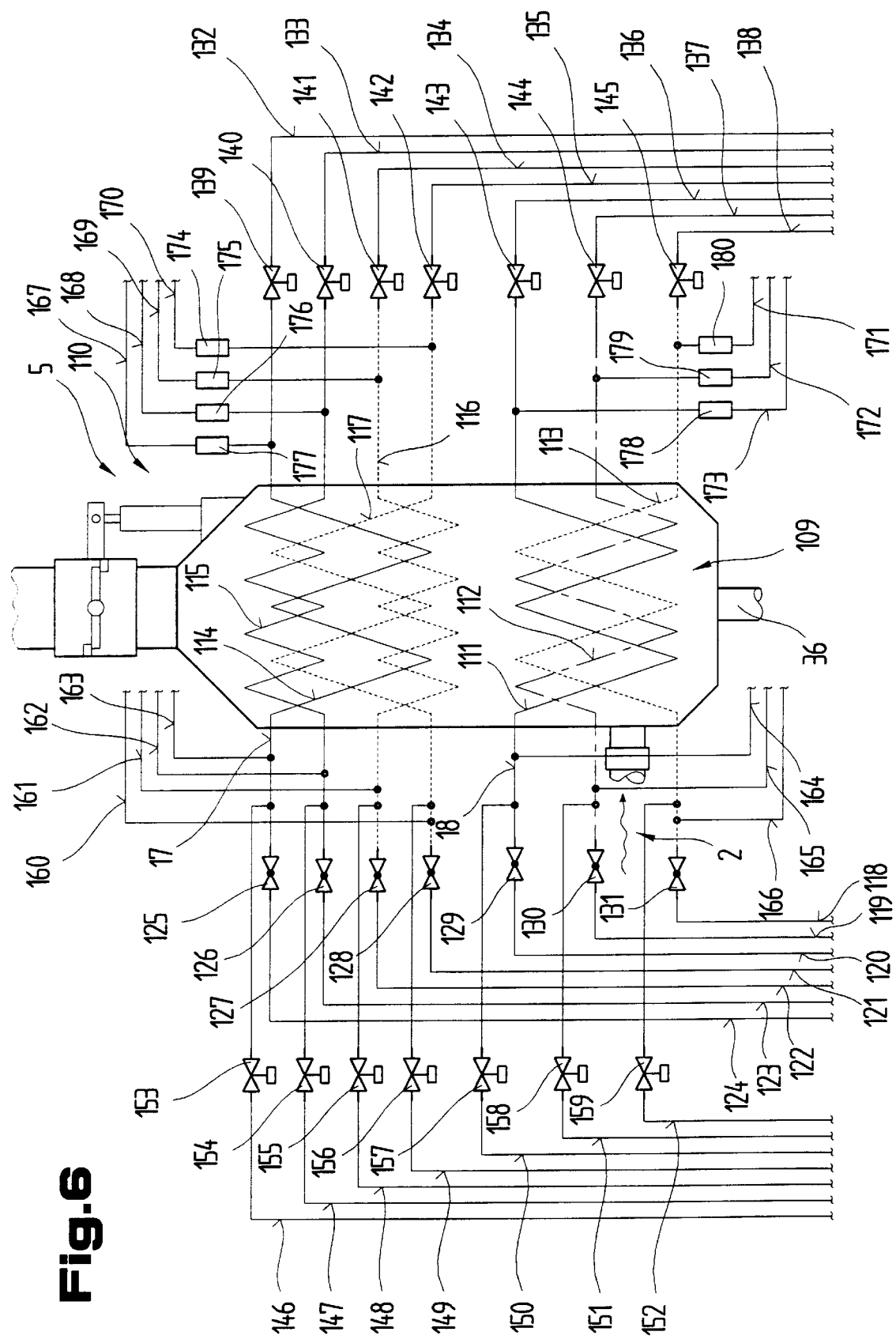
Figure 7:
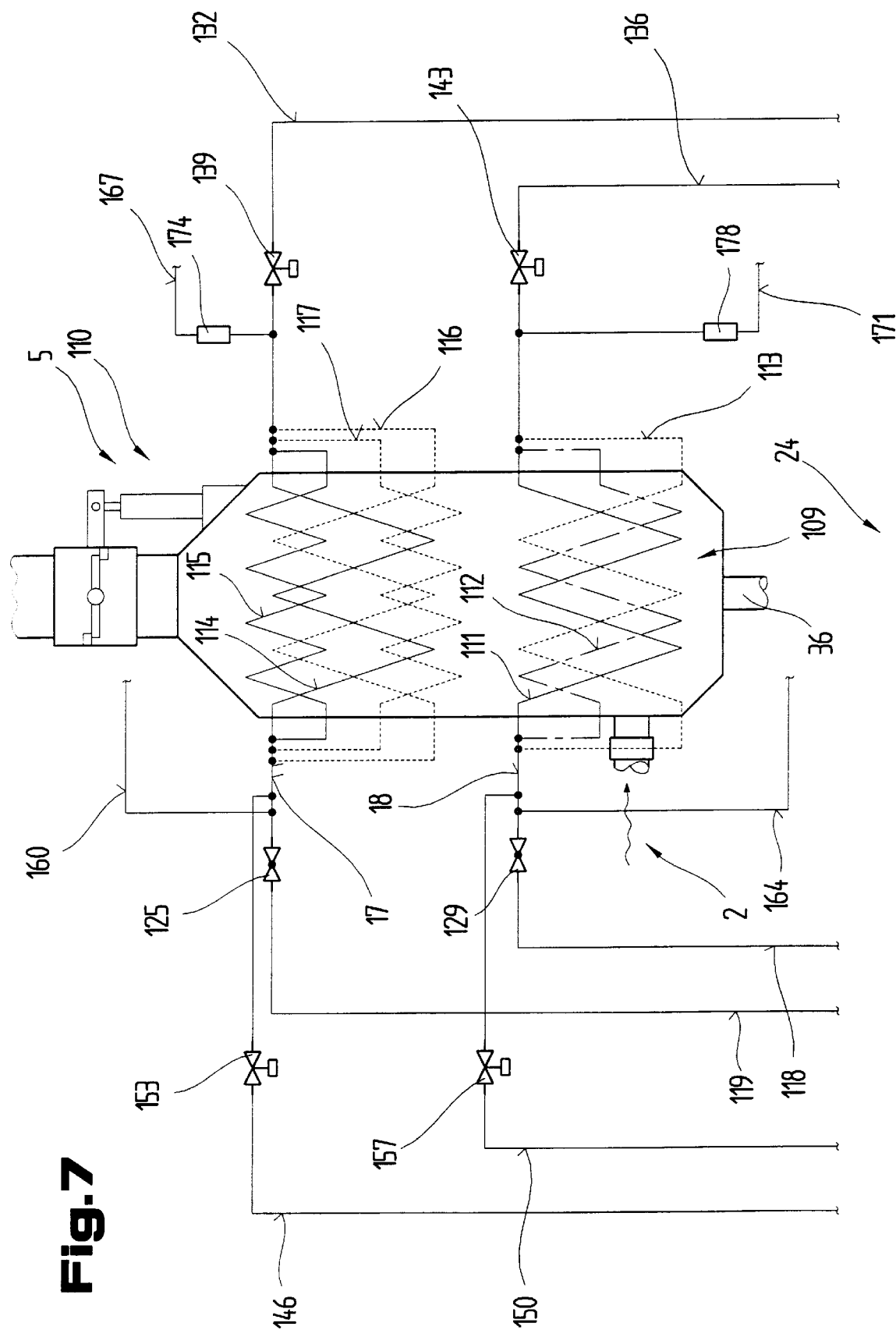
Figure 8:
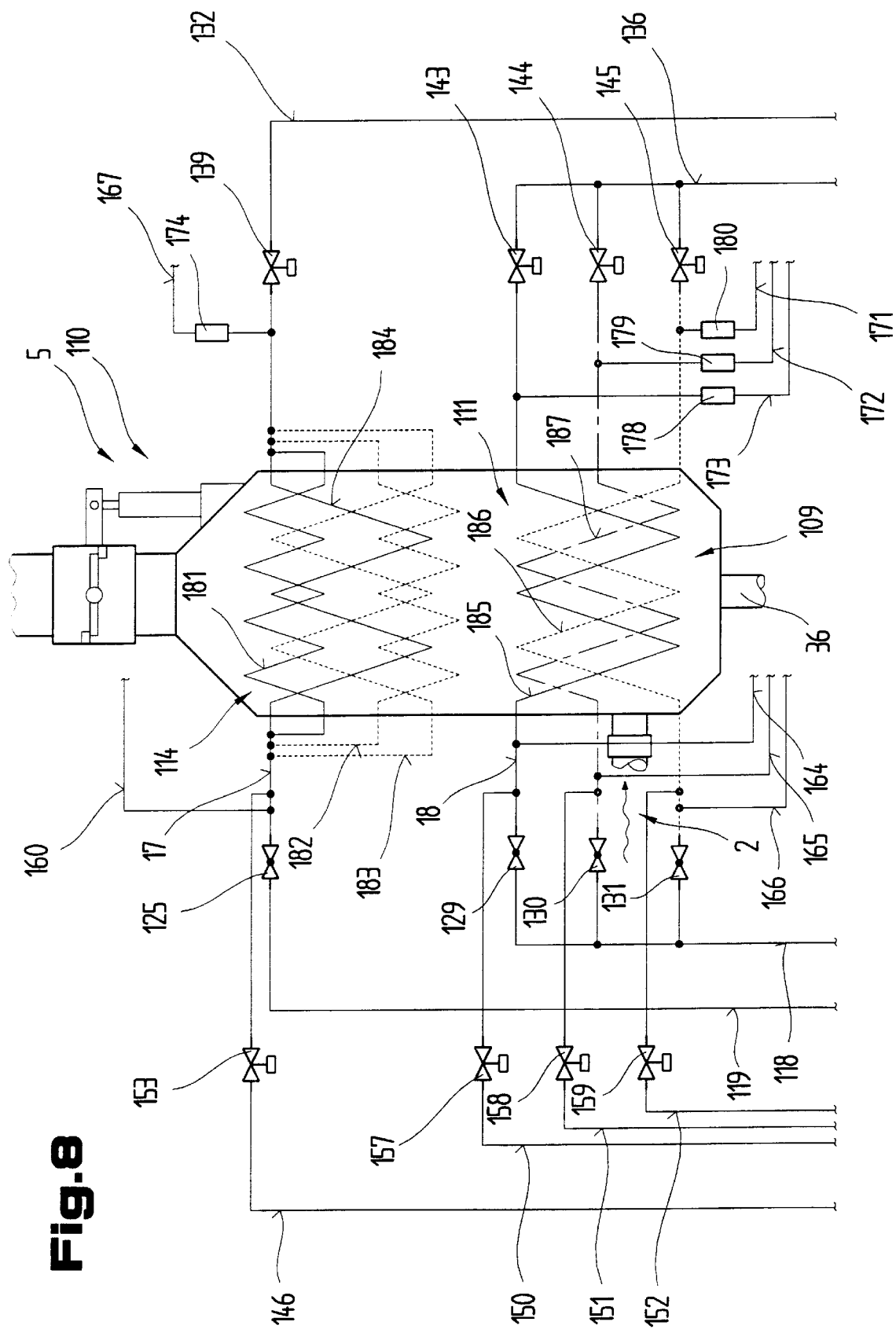
Figure 9:
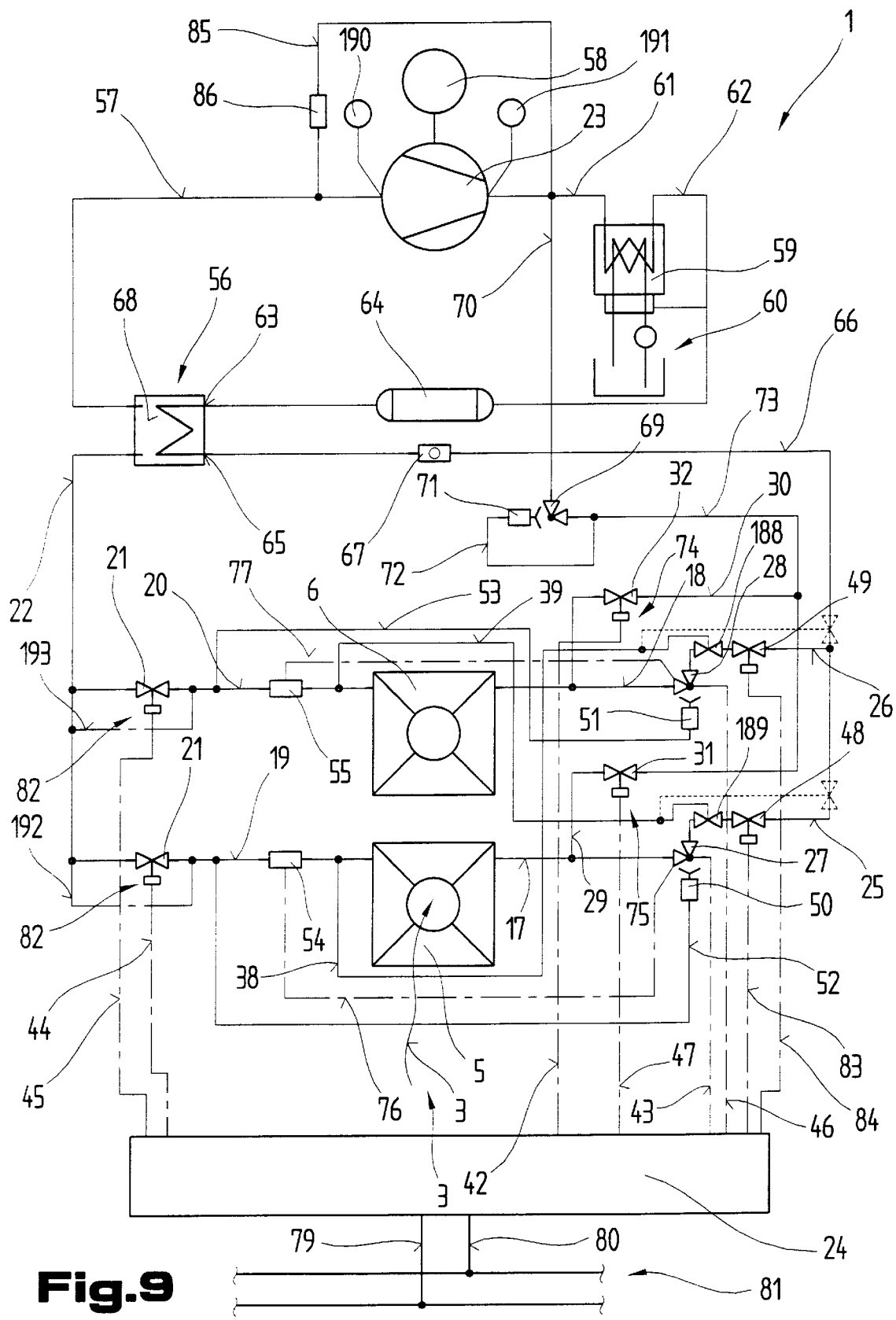
Figure 10:
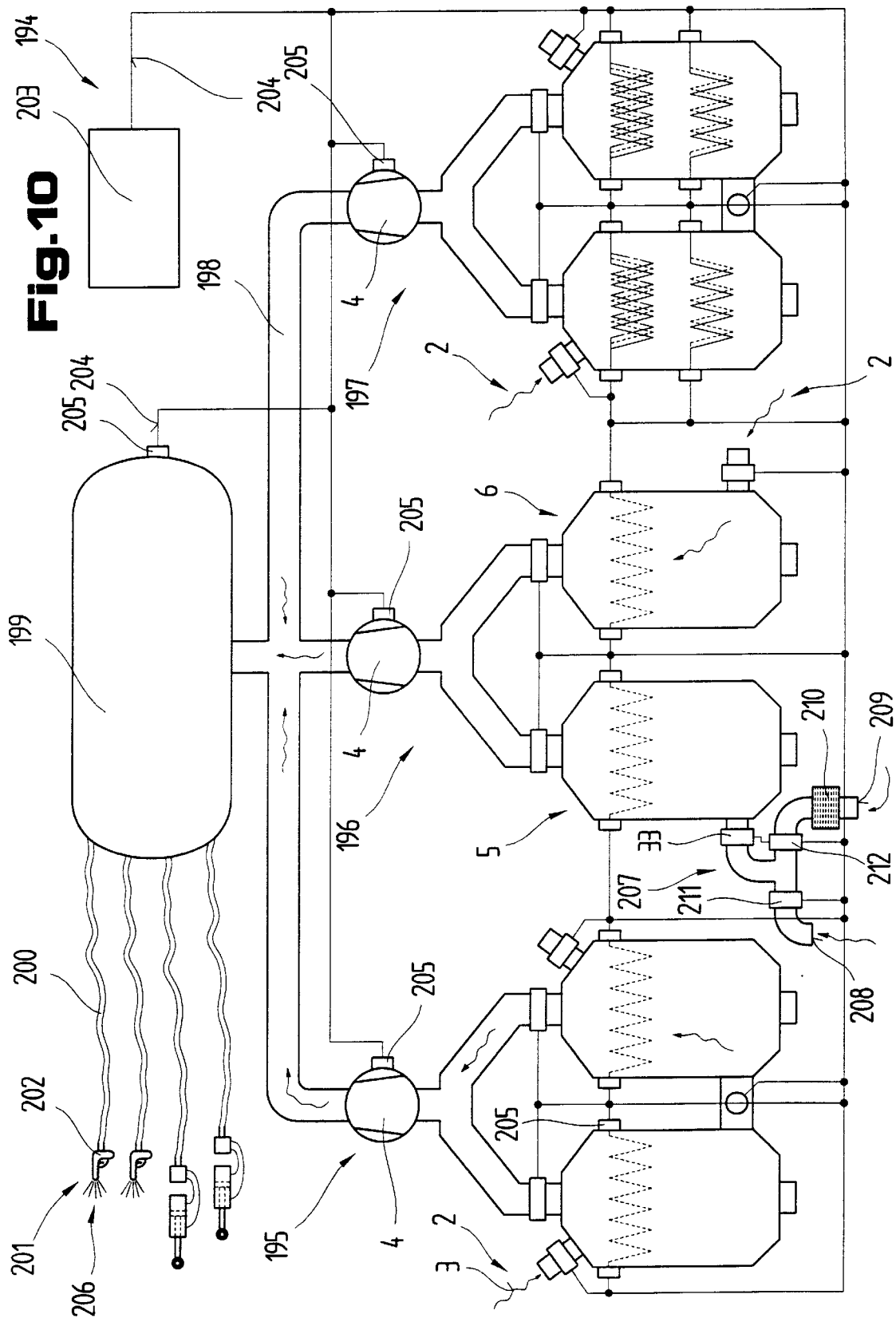
Figure 11:
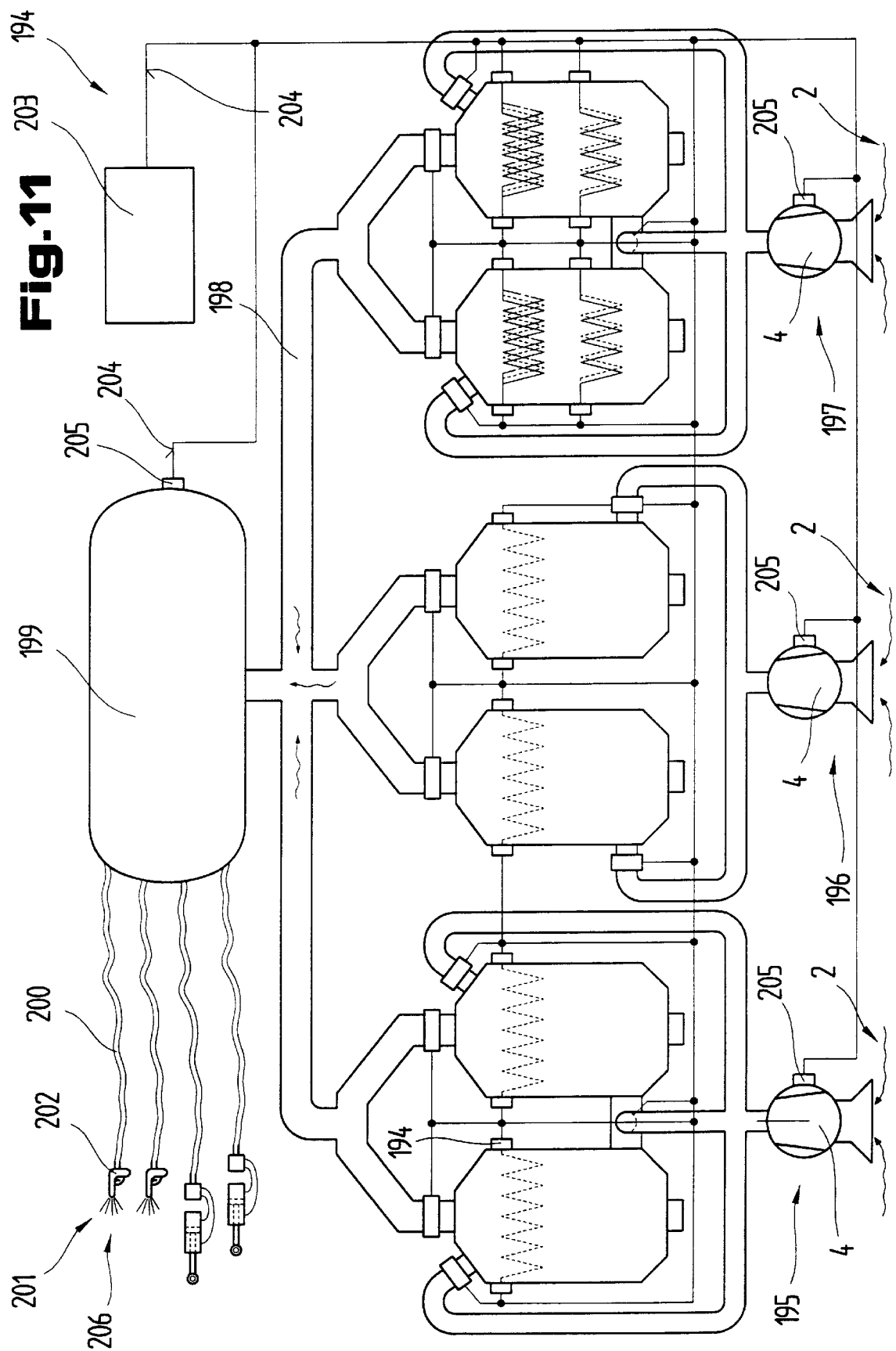
Figure 12:
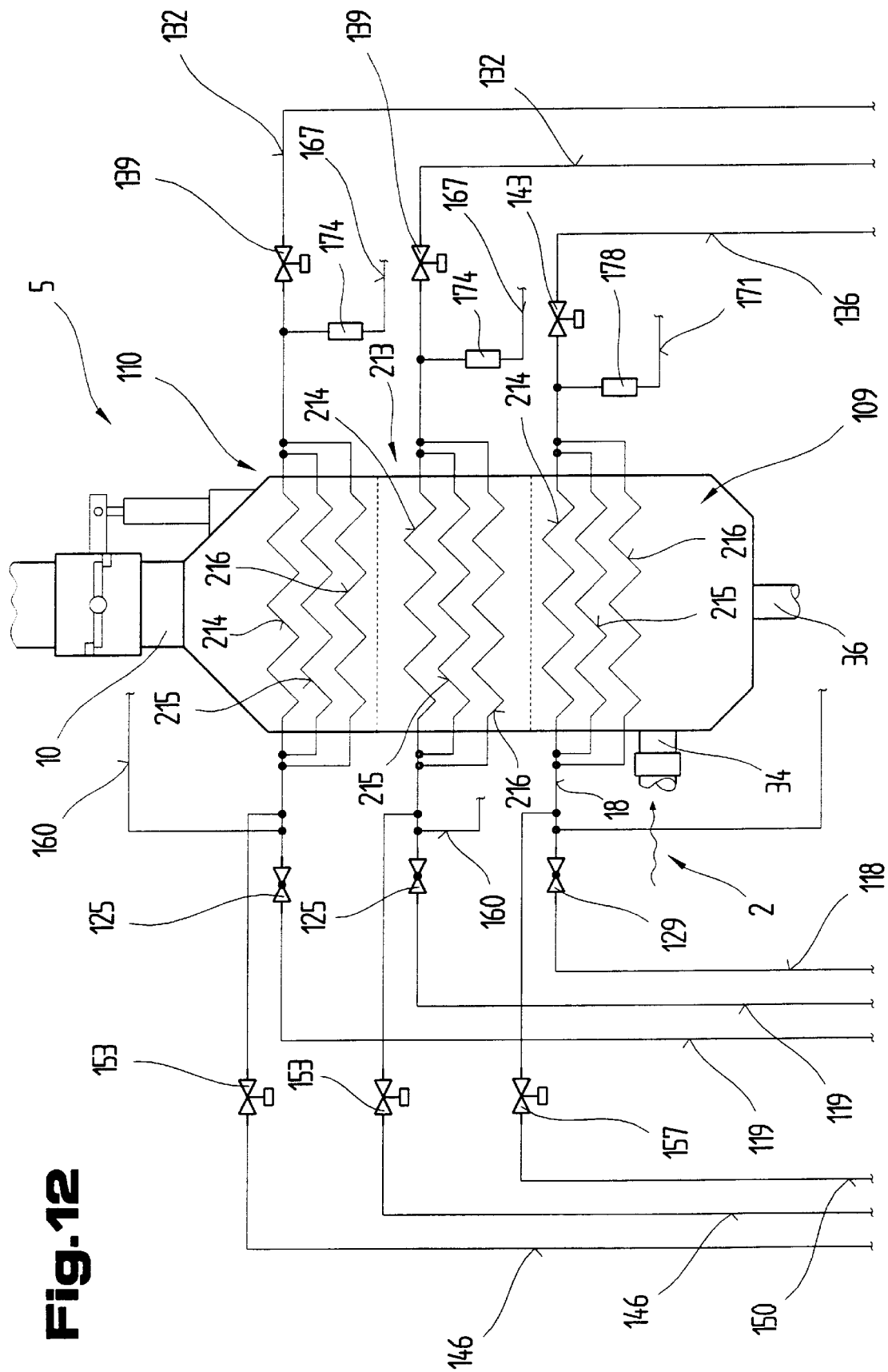

They show:

FIG. 1 a block diagram of a device according to the invention for compressing gases in a simplified, diagrammatic view;

FIG. 2 a block diagram of the device according to the invention for compressing gases with two refrigerating driers arranged parallel to one another and a hot gas defroster;

FIG. 3 a block diagram of the device according to the invention for compressing gases with two refrigerating driers arranged parallel to one another and a hot gas defroster;

FIG. 4 a diagram of the temperature path of the device according to the invention;

FIG. 5 a block diagram of a different design variant of the device according to the invention in a simplified, diagrammatic view;

FIG. 6 a block diagram of a further embodiment of the device according to the invention, in which only one of several refrigerating driers is shown, which comprises several heat exchangers arranged behind one another in the direction of flow, in a simplified, diagrammatic view;

FIG. 7 a block diagram of a further embodiment of the device according to the invention;

FIG. 8 a block diagram of a further embodiment of the device according to the invention;

FIG. 9 a block diagram of a further embodiment of the device according to the invention for compressing gases with two refrigerating driers arranged parallel to one another and a hot gas defroster;

FIG. 10 a block diagram of an installation, in which several devices according to the invention are connected together for compressing gases in a simplified, schematical view;

FIG. 11 a block diagram of an installation according to the invention in which several refrigerating driers are connected together on the pressure side of a compressor, in a simplified schematical view;

FIG. 12 a block diagram of a different embodiment of the device according to the invention in a simplified schematical view.

In FIG. 1 a device 1 is shown for compressing a gas 2 which is indicated schematically by arrows 3. Said device 1 comprises a compressor 4, whereby both screw compressors and piston compressors or radial compressors can be used with or without oil injection, and two refrigerating driers 5, 6 arranged upstream thereof. The two refrigerating driers 5, 6, are connected by suction lines 7, 8 to a suction-side suction point 9 of the compressor 4. Between an outlet 10, 11 of the refrigerating driers 5, 6 and the suction lines 7, 8 air-tight sealing flaps 12, 13 are arranged which are adjustable by drives 14, such as e.g. cylinder piston arrangements or electromagnetic arrangements, from the closed position shown for sealing flap 12 into the opened position shown for the sealing flap 13.

At least one heat exchanger 15, 16 is arranged in each refrigerating drier 5, 6. Each heat exchanger 15, 16 is connected with a connection line 17, 18 or a suction line 19, 20 of a refrigerant circuit. The gaseous refrigerant in the suction lines 19, 20 emerging from the heat exchanger 15, 16 is suctioned in particular via a solenoid valve 21 and a suction line 22 by a refrigerant compressor 23. Control device 24 is provided to control or regulate the device 1 to which the individual solenoid valves 21 and drives 14 are connected.

The refrigerant is conveyed further by the refrigerant compressor 23 or a connected condenser via pressure lines 25, 26 and adjustable or controllable expansion valves 27, 28 which can be used simultaneously as stop valves for example, into the connection lines 17, 18, that is the inlet of heat exchanger 15, 16. Furthermore, it is also possible on using non-closable expansion valves 27, 28 to arrange a solenoid valve upstream or downstream of the latter in order to interrupt the refrigerant circuit.

Furthermore, the connection line 17 or 18 is connected via a bypass line 29, 30 with the interconnection of a solenoid valve 31, 32 for the hot gas to the line between the refrigerant compressor 23 and the condenser.

In addition, the refrigerating driers 5, 6 have further sealing flaps 33 which are gas-proof in a closed state at least from the gases 2 coming in from the direction of suction point 34.

Furthermore, the refrigerating driers 5, 6 are connected together by a connection line 35. This connection line 35 connects the openings of the refrigerating driers 5, 6 opposite the sealing flaps 12, 13. The connection line 35 and the refrigerating driers 5, 6 have an outflow 36 which is arranged on the suction side of the refrigerating driers 5, 6 for the removal of condensate. During the cooling of the gas 2 suctioned in by the compressor 4 and on defrosting the ice produced during cooling by the high air humidity, the water from the melted ice can be removed through the outflow 36. Furthermore, a sealing flap 37 is arranged in this connection line 35, which preferably, but not necessarily, is gas-proof in a closed state at least from gases 2 emerging from the direction of suction point 34.

The suction lines 19, 20 are each connected at the output of the heat exchanger 15, 16 upstream of the solenoid valves 21 to a return line 38 and 39, whereby in the return line 38, which is connected to the suction line 19, a check valve 40 acting against return flows from the connection line 18 is arranged, so that the return line 38 can be connected to the connection line 18, whilst the suction line 20 is connected to the connection line 17 by the return line 39 and a check valve 41 effective against the inflow of refrigerant gas from the connection line 17.

The method for cooling a gas 2 to be compressed according to the invention is as follows:

The gas 2 to be compressed is suctioned in the device 1 shown with an open sealing flap 33 of the refrigerating drier 5 through the compressor 4 via the suction point 34 into the refrigerating drier 5. The suctioned gas 2 then passes through the heat exchanger 15 which is defrosting at this time, i.e. is freed from the condensate produced in the form of ice. On passing warm air over the ice or heat exchanger 15 covered with cold defrosted water from the ice the suctioned gas 2 is cooled and removes some of the moisture contained in the gas 2 in the form of water vapour.

After the suctioned gas 2 has passed through the heat exchanger 15 and the connection line 35 the gas 2 flows through the heat exchanger 16 cooled to the desired temperature and is thereby cooled to the desired, prescribed temperature, whereupon the liquid still contained in the suctioned gas 2 in the form of water vapour is separated. The separated liquid is deposited as frost or ice on the heat exchanger 16 or the walls of the refrigerating drier 6 owing to the below 0° C. temperatures of the heat exchanger 16. From there the gas cooled to below 0° C., preferably to temperatures of between −10° C. and −50° C., enters the opened sealing flap 13, which is designed to be gas-proof in both directions, to the suction-side suction point 9 of the compressor 4.

The cooling of the heat exchanger 16 is performed by a refrigerant. Said refrigerant is compressed in the refrigerant compressor 23 and afterwards cooled in a condenser that is not described in more detail, so that it enters into the liquid state and is then fed through the pressure line 26 to an expansion valve 28. On the expansion of the refrigerant the refrigerant removes heat from the environment and cools the heat exchanger 16, depending on the amount of refrigerant supplied, whereby control is performed via the expansion valves 27 or 28 by means of the control device 24. The control of the individual solenoid valves 21 of the expansion valves 27, 28 of the sealing flaps 12, 13, 33, 37 is performed by control lines 42 to 47.

For the cooling of the heat exchanger 15 the latter is also connected to the condenser downstream of the refrigerant compressor 23 by the pressure line 25, in which the liquefied refrigerant is supplied to the expansion valve 27, where the fall in pressure occurs to gasify the refrigerant, and is connected by a connection line 17 to the heat exchanger 15. The return of the refrigerant to the refrigerant compressor 23 occurs through the suction line 19 and 22.

In the operating state shown in FIG. 1 the gas 2 to be compressed, for example air, is drawn as indicated by the schematical arrows 3 through suction point 34 in the region of the refrigerating drier 5 and conveyed through the heat exchanger 15 and the connection line 35 into the region of the refrigerating drier 6. Afterwards the gas 2 flows through or washes over the heat exchanger 16 and passes through sealing flap 13 into the suction line 8, which supplies the now dehumidified and overcooled gas 2 to the suction point 9 of the compressor 4.

In this mode of operation, as shown, the sealing flap 12 which is airtight in both directions of flow is also closed like sealing flap 33 assigned to the refrigerating drier 6 and sealing flap 37 arranged in the connection line 35.

The cooling of the gas 2 in the refrigerating drier 6 causes the heat exchanger 16 of the refrigerating drier 6 to ice up, i.e. droplets of water are separated from the suctioned gas 2 so that only dry gas 2 is suctioned by the compressor 4. This has the advantage that liquid impact on the compressor 4 caused accumulations of water can be prevented and leads in a surprising way simultaneously to a cleaning of the suctioned gas 2, as suspended components in the suctioned gas 2 are separated or held on the icy or wet surfaces of the heat exchanger 16 and can then be removed in the subsequent defrosting of the heat exchanger 16 through the outflow.

A further advantage of this overcooling of the suctioned gas 2 is that the operating temperature of the compressor 4 is extremely low, so that even in compressors 4 with oil injection there is no gasification or vaporisation of the oil and vaporised oil is thus prevented from mixing with the gas 2, as no more moisture is contained in the gas 2. In this way, also in connection with the strong drying of the gas 2 by the liquid removal in the heat exchangers 15 or 16 mixtures of oil and water do not occur and otherwise difficult to dispose of oil-water emulsions are prevented.

As when the heat exchanger 16 ices up too far the suctioned gas 2 can no longer be cooled to the desired temperature, the latter must be freed from ice, i.e. the heat exchanger 16 must be defrosted, to permit an uninterrupted supply of dried, cooled gas 2 to the suction point 9 of the compressor 4. For this firstly the sealing flap 37 is opened in the connection line 35 so that the gas 2 required by the compressor 4 is now suctioned through the suction point 34 assigned to sealing flap 37. At the same time via the control device 24 the heat exchanger 15 is cooled to the desired operating temperature range in that liquid refrigerant is fed into the heat exchanger 15 via the pressure line 25 and the expansion valve 27 of the connection line 17. Furthermore, the sealing flap 33 of the refrigerating drier 5 is closed. If the heat exchanger 15 is cooled sufficiently sealing flap 13 is closed and sealing flap 12 opened. Thereupon the gas 2 to be compressed is guided via the suction point 34 past the sealing flap 37 to refrigerating drier 6 and the gas 2 is cooled and dried thereby and subsequently fed via the opened sealing flap 12 to the suction point 9 of the compressor 4.

Afterwards or if necessary simultaneously with the opening of sealing flap 12 and closing of sealing flap 13, sealing flap 33 of the refrigerating drier 6 is opened and simultaneously or directly after opening sealing flap 33 sealing flap 37 in the connection line 35 is closed. In this way the gas 2 to be compressed has a higher temperature than the temperature of the previously used heat exchanger 16 of the refrigerating drier 6, and the solid frozen condensate on the heat exchanger 16 or on the walls of the refrigerating drier 6 is defrosted and can flow out through outflow 36.

However, in order to accelerate the defrosting of the heat exchanger 16 in the refrigerating drier 6 the control device 24 activates the solenoid valve 32 for hot gas via the control line 47, whereby from the refrigerant compressor 23, bypassing the condenser, the gaseous refrigerant can flow at a high temperature through bypass line 30 to the heat exchanger 16. In the heat exchanger 16 the hot refrigerant now flows through the iced-up heat exchanger 16, whereby the heat exchanger 16 is heated and defrosts the condensate frozen thereonto. The refrigerant cooled by the flow through of the iced up heat exchanger 16 reaches the connection line 17 via the return line 39 and the check valve 41. There on flowing into the connection line 17 the refrigerant cooled and liquefied by the heat exchanger 16 changes into a gaseous state because of the drop in pressure caused thereby, and in this way supports the cooling of the heat exchanger 15 in the refrigerating drier 5. The exact temperature of the heat exchanger 15 is maintained by means of the control of the expansion valve 27, so that depending on the defrosted state of the heat exchanger 16 and the changing temperatures of the inflowing liquefied refrigerant caused thereby, sufficient liquefied refrigerant can pass through the expansion valve 27 to achieve the desired cooling of the heat exchanger 16.

Once the inner chamber of the refrigerating drier 6 has reached a presettable temperature the control device 24 opens sealing flap 37 and simultaneously closes sealing flap 33 of the refrigerating drier 6, whereby now the gas 2 is suctioned through the sealing flap 37. This has the advantage that if the temperature of the inner chamber of the refrigerating drier 6 is too high the gas 2 would no longer be pre-cooled and would be saturated with the water vapour produced on defrosting the heat exchanger 16.

Once the refrigerating drier 6 is completely defrosted the solenoid valve 32 is closed by the control device 24 and the expansion valve 28 is activated by control device 24. Here the refrigerating drier 6 is cooled to a specific temperature in order to ensure a rapid cooling of the gas 2 on switching from refrigerating drier 5 to refrigerating drier 6. Once refrigerating drier 6 has been pre-cooled to the preset temperature, the sealing flaps 12, 13, 33, 37 can be again switched over, in that sealing flap 12 is closed and sealing flap 13 is opened, and thus the gas 2 suctioned through the sealing flap 37 in the connection line 35 is dried by the refrigerating drier 6 and cooled and is delivered via the sealing flap 13 to the suction point 9 of the compressor 4. The corresponding switching over of sealing flap 33 of the refrigerating drier 5 can then be performed subsequently, whereby afterwards the heat exchanger 15 iced-up during operation is defrosted accordingly as described for heat exchanger 16.

Depending on the selected suction temperature for the gas 2 at suction point 9 of the compressor 4, after a specific pre-programmable period of time or after determining a corresponding formation of ice the switching over between cooling of suctioned gas 2 and defrosting the heat exchanger 15 and 16 is performed.

In FIGS. 2 and 3 the device 1 according to the invention for compressing a gas 2 is shown with reference to a detailed schematical circuit diagram of the control device 24. The refrigerating driers 5, 6 and their heat exchangers 15, 16 are connected to the pressure line 25, 26 by the connection lines 17, 18 with the expansion valves 27, 28 with the interconnection of solenoid valves 48, 49. Each of the expansion valves 27, 28 also has a pressure sensor 50, 51 by means of which via the connection of pressure lines 52, 52 to the suction line 19, 20 the pressure of the gaseous refrigerant can be established directly or indirectly. From the pressure it is thus also possible to monitor the temperature of the refrigerant and because of the changing pressure values in the suction line 19, 20 the amount of refrigerant to be supplied to the heat exchangers 15, 16 can be controlled by the expansion valves 27, 28 accordingly.

The suction lines 19, 20 are connected via the solenoid valves 21 to the suction line 22. A temperature sensor 54, 55 is arranged between the solenoid valve 21 and each heat exchanger 15, 16. However, it is also possible that instead of the temperature sensor 54, 55 a pressure gauge device is used, whereby the temperature of the refrigerant can be determined by the pressure of the refrigerant. The pressure sensors 50, 51 connected to the pressure lines 52, 53 are connected between the solenoid valves 21 and the temperature sensors 54, 55 to the suction line 19, 20.

The output of the solenoid valves 21 is connected to the suction line 22 which enters into a heat exchanger 56. The heat exchanger 56 is connected by a suction line 57 to an inlet of the refrigerant compressor 23. The refrigerant compressor 23 is here driven by a motor 58. A condenser 59 is connected by a line 61 to the output of the refrigerant compressor 23, in which condenser the hot compressed gaseous refrigerant is cooled until it condenses by means of cooling-water circuit 60, preferably using the reverse flow principle. Usually the condenser 59 which is driven in reverse direction flow is designed so that it can take in a corresponding amount of refrigerant and at the same time fulfils the function of a tank. If, for example, a condenser 59 is used, in which the refrigerant is cooled by means of air, a tank is also arranged in the refrigerant circuit in order to keep an appropriate reserve of refrigerant in supply.

Furthermore, the condenser 59 is connected by a line 62 to an input 63 of the heat exchanger 56 with the interconnection of a liquid converter 64. Said liquid converter 64 serves to separate any moisture contained in the refrigerant, i.e. water vapour or water droplets and to prevent an unpermitted increase in moisture or water in the refrigerant. The heat exchanger 56, in which the hot refrigerant emerging from the liquid converter 64 flows, serves to dry the gaseous refrigerant flowing through on the suction side, i.e. so that any liquid components of the refrigerant still present in the flow of gaseous refrigerant are deposited in the heat exchanger 56, which operates as a refrigerant drier, and are heated by the hot refrigerant, and vaporise so that liquid refrigerant is prevented from being supplied on the suction side of the refrigerant compressor 23. An output 65 of the heat exchanger 56 is connected via a pressure line 66, which divides into the pressure lines 25, 26 for the heat exchangers 15, 16, possibly with the interconnection of a sight glass 67, to the expansion valves 27, 28 via solenoid valves 48, 49, whereby the circuit for a refrigerant 68 is closed.

To defrost the heat exchanger 15, 16 a hot gas regulator 69 is connected by line 70 to line 61. The hot gas regulator 69 comprises in turn a pressure sensor 71, which is connected by a pressure line 72 to the output of the hot gas regulator 69. The output of the hot gas regulator 69 is connected to the solenoid valves 31, 32 for the hot gas by a by-pass line 73 which divides in turn into the bypass lines 29 and 30 for each heat exchanger 15, 16. The solenoid valves 31, 32 are provided with a drive 74, 75 for remote control by the control device 24.

The temperature sensors 54, 55 are connected by control lines 76, 77 to the expansion valves 27, 28. Of course, it is also possible to transfer the measurement results of the temperature sensors 54, 55 and the pressure sensors 50, 51 and 71 via control lines 78, as shown by dash-dot lines, to the control device 24, which can control the expansion valves 27, 28 via the control line 43, 46.

The control device 24 is here connected by lines 79, 80 to a current source 81 which is preferably in the form of an electricity supply company network. The solenoid valves 31, 32 can in addition also be connected to the control device 24 by control lines 42, 47.

Furthermore, solenoid valves 21, solenoid valves 48, 49 and solenoid valves 31, 32 are provided with a drive 82. The drive 82 is here connected by control lines 42, 44, 45, 47, 83, 84 to the control device 24 which can be in the form of electromagnets or electric servomotors, for example stepping motors or the like.

The expansion valves 27, 28 are connected by the control lines 43, 46 to the control device 24, whereby the amount of the refrigerant 68 to be expanded can be controlled or monitored.

As described in FIG. 1 the output of the heat exchanger 15 is connected by the return line 38 with the interconnection of the check valve 40 to the input of the heat exchanger 16 or the connection line 18. The output of the heat exchanger 16 is however connected to the input of the heat exchanger 15 by the return line 39 with the interconnection of the check valve 41.

The gas 2 to be compressed in the device 1 shown in FIG. 1 is suctioned by the compressor 4 via the heat exchanger 16 of the refrigerating drier 6, the opened sealing flap 13, the suction line 8 and suction point 9 and compressed in the compressor 4 by the desired amount. The heat exchanger 16 is arranged in a refrigerant circuit in order to permit the cooling of the suctioned gas 2 and the separation of the liquid contained in the suctioned gas 2 and its removal.

To explain better the different function on cooling the suctioned gas 2 with the heat exchangers 15 or 16 of the refrigerating driers 5 or 6, all the lines in the refrigerant circuit which are required to cool the suctioned gas 2 with the heat exchanger 16 of the refrigerating drier 6, are indicated by broken lines.

The gaseous refrigerant 68 highly compressed by the refrigerant compressor 23 is fed through the condenser 59 and brought into the liquid state by cooling and then fed into the liquid converter 64. From here the refrigerant 68 passes through the heat exchanger 56, pressure line 66 and pressure line 26 to the solenoid valve 49. If the solenoid valve 49 is opened by the control device 24 via the control line 84 the liquid refrigerant 68 can flow further to the expansion valve 28. By means of the drop in pressure in the connection line 18 arranged downstream of the expansion valve 28 the liquid refrigerant 68 expands and enters into a gaseous state. As in the expansion of the refrigerant 68 energy is used in order to obtain the transfer from the liquid into the gaseous state. The required energy is taken from the liquid refrigerant 68 and the heat exchanger 16. Here cooling occurs by means of the vaporisation coldness.

On the operation of such a device 1 the arrangement can be such that the refrigerant 68 in the line 61 has a temperature of between +70° C. and +105° C., preferably +80° C. to +90° C. and is gaseous at the selected compression pressure. In the condenser 59 for example by means of the cooling-water circuit 60 or with corresponding air cooling so much energy is removed from the refrigerant 68, that the latter is cooled until under the existing pressure conditions it has a temperature of between +25° C. and +60° C., preferably +35° C., whereby the pressure in a refrigerant, in particular of the R22 type, is 13.5 bars. By means of this cooling the refrigerant 68 is liquefied and more heat energy is removed in the following heat exchanger 56 by means of cooling in the reverse flow with cold, suctioned gaseous refrigerant 68 so that it flows to the expansion valve 28 at a temperature of between +15° C. and +25° C., preferably +20° C. Because of the drop in pressure in the expansion valve 28 the liquefied refrigerant 68 enters the gaseous state, whereby the amount of refrigerant 68 supplied by the expansion valve 28 is controlled so that the pressure of the refrigerant 68 controlled by the pressure line 53 in the suction line 20 corresponds for example to a nominal pressure of 4.8 bars and at the same time the temperature monitored by the temperature sensor 55 is higher than the nominal temperature of 5° C. corresponding to the nominal pressure of 4.8 bars. In this way, an overheating of the refrigerant 68 in the suction line 20 is obtained, which, as explained in the following in more detail, ensures that a transfer from the gaseous into the liquid state is excluded even with changing external influences, in order to prevent liquid impact in the refrigerant compressor 23.

Depending on the amount of liquid refrigerant 68 supplied or expanded by the expansion valve 28, a larger or smaller amount of heat can be removed from the heat exchanger 16 and thus a predeterminable temperature of the suctioned gas 2 can be obtained in the region of the suction point 9, whereby in the region of the suction line 8 or the suction point 9 the temperature of the suctioned gas 2 can be measured.

The amount of refrigerant 68 supplied by the expansion valve 28 can be regulated by means of the pressure sensor 51 in a direct control circuit by the pressure existing in the pressure line 53, which pressure sensor can change the opening width of the expansion valve 28, whereby in addition the control device 24 can influence the control values or the function of the expansion valve 28. Such an additional influence of the expansion valve 28 by the control device 24 is mainly necessary if an exact temperature of the suctioned gas 2 is required in the region of the suction point 9 of the compressor 4 for the gas 2. If the control circuit is regulated using the pressure line 53 and the pressure sensor 51 on the basis of pre-defined pressure conditions and temperature conditions in the suction line 20, the temperature of the suctioned gas 2 at suction point 9 can vary depending on the temperature of the gas 2 in the region of suction point 34. For example, if it is colder in winter on the compression of air drawn in by the refrigerating drier 5, 6, with equal refrigerating capacity the air is colder and accordingly denser at suction point 9 of the compressor 4.

The temperature sensor 54 here detects the actual temperature and the pressure sensor the actual pressure. With direct control in a closed control circuit without any influence by the control device 24 the nominal temperature and the nominal pressure are adjusted at expansion valve 28. By means of the pressure line 53 and the pressure sensor 51 and the temperature sensor 55 which is connected by the control line 77 to the expansion valve 28, the refrigerant 68 supplied via the expansion valve 28 is controlled so that the actual temperature and the actual pressure correspond to the nominal temperature and the nominal pressure.

Furthermore, it is also possible that the temperature sensors 54, 55 and the pressure sensors 50, 51 are connected to the control device 24. In this case the actual temperature is detected by the temperature sensors 54, 55 and the actual pressure by pressure sensors 50, 51 and conveyed to the control device 24. The actual temperature and/or the actual pressure is subsequently compared in the control device 24 with the nominal temperature and/or the nominal pressure which can be set by an input device, whereby the control device 24 subsequently activates the expansion valves 27, 28 depending on the difference between the nominal and actual temperature and/or pressure and thus the amount of liquid refrigerant 68 to be expanded can be controlled.

Once the refrigerant 68 has been brought into a gaseous state it flows through the heat exchanger 16, in which the suctioned gas 2 is cooled to the corresponding temperature. Afterwards, the gaseous refrigerant 68 flows through the suction line 20 and the solenoid valve 21 to the suction line 22 and from there into the heat exchanger 56. From here the gaseous refrigerant 68 is drawn through the suction line 57 by the refrigerant compressor 23. By compressing the gaseous refrigerant 68 with the refrigerant compressor 23 the gaseous refrigerant 68 is compressed to a high pressure and afterwards is liquefied in the condenser 59 by cooling whereby the refrigerant circuit is closed.

After, as described with reference to the block diagram in FIG. 2, the gas 2 drawn in by the compressor 4 has been cooled in the refrigerating drier 6, with reference to FIG. 3 the defrosting cycle is described for the said refrigerating drier 6, which was previously responsible for cooling the gas 2, in which the deposit of condensate on the heat exchanger 16 in the form of ice is defrosted. The circuit of lines required to defrost the ice is illustrated by broken lines.

During the defrosting process described in the following the gas 2 required for the compressor 4 is cooled in the refrigerating drier 5 and supplied in cooled form to the compressor 4, as shown in FIG. 1. The layer of ice on the heat exchanger 16 is formed in that by the overcooling of the suctioned gas 2 the moisture contained in the gas 2 is separated and frozen solid by the below freezing temperatures in the region of the heat exchanger 16. As such a layer of ice has a high insulating effect after a certain period of operation, the heat absorption of the refrigerant 68 in the heat exchanger 15 or 16 is no longer sufficient to ensure the desired overcooling of the suctioned gas 2.

This is monitored for example in the operating heat exchanger 16 so that by means of temperature sensors 55 and pressure sensors 51 in the region of the suction line 20 the temperature or the pressure of the refrigerant 68 is monitored after leaving the heat exchanger 16.

If the temperature or the pressure of the gaseous refrigerant 68 emerging from the heat exchanger 16 is lower than the nominal temperature or the nominal pressure i.e. insufficient coldness is removed from the refrigerant 68 in the heat exchanger 16 because of the insulating effect of the layer of ice, this is detected by the control device 24 taking into account any other parameters, such as for example the temperature of the environment. Of course, it is possible that the control can be performed to introduce the defrosting process over a presettable period of time.

During the defrosting process described in the following the gas 2 required for the compressor 4 is cooled in the refrigerating drier 5 and supplied in a cooled form into the compressor 4, as described in FIG. 1.

By means of the control device 24 the gasproof sealing flap 13 assigned to the heat exchanger 16 to be defrosted is then closed and the expansion valve 28 is pressurised by the control device 24 so that the supply of liquid refrigerant 68 is interrupted.

Furthermore, the drive 74 of the solenoid valve 32 is pressurised by the control device 24, whereby the bypass line 30 is connected to the connection line 18 and the hot gas discharged by the hot gas regulator 69 is fed via the bypass line 73 into the connection line 18 of the heat exchanger 16. In this way the inner chamber of the heat exchanger 16 is heated. On being heated the ice, which has accumulated on the walls of the heat exchanger 16 or on the walls of the refrigerating drier 6, defrosts and flows off through the outflow 36 as shown in FIG. 1.

For defrosting which is only necessary when the temperatures of the gas 2 required by the compressor 4 are below 0° C., which is predominantly the case in the installations described here, the hot gaseous refrigerant 68, e.g. at a temperature of between +70° C. and +105° C., is supplied via the bypass line 30 and the solenoid valve 32 into the connection line 18 of the heat exchanger 16 between the latter and the expansion valve 28.

During this supply of hot, gaseous refrigerant 68 into the heat exchanger 16 the gasproof sealing flap 13 is closed, cf. FIG. 1. This is because on defrosting the layer of ice on the heat exchanger 16 vapour is produced which is saturated with water, and if the sealing flap 13 was not gasproof the vapour could be suctioned by low pressure into the suction line 8 and thus reach the compressor 4, whereby the desired drying effect of the suctioned gas 2 would not occur or there is a risk of water impact in the compressor 4.

Furthermore, the solenoid valve 21 of the suction line 20 is also closed whereby the suction line 20 is connected by the return line 39 with the interconnection of the check valve 41 to the connection line 17, and the heat exchanger 15, in which the suctioned gas 2 is cooled, is supplied with the cooled refrigerant 68 of the heat exchanger 16. The hot, gaseous refrigerant 68 supplied via the bypass line 30, the amount of which is controlled by the hot gas regulator 69 amounts to only a small proportion for example 10 to 20% of the total refrigerant 68 expanded by the expansion valve 27.

By means of the coldness in the refrigerating drier 6 to be defrosted the hot, gaseous refrigerant 68 is liquefied by cooling and passes from the output of the heat exchanger 16, i.e. the suction line 20, via the return line 39 and the check valve 41 to the connection line 17 of the heat exchanger 15. Thus a gaseous, cold refrigerant 68 for the heat exchanger 15 of the refrigerating drier 5 flows through the connection line 17. Because of the difference in pressure between the connection line 17 and the return line 39 the refrigerant 68 liquefied by the heat exchanger 16 is again gaseous and mixes with the gaseous refrigerant 68 in the connection line 17, whereby the refrigerant circuit is closed for the defrosting of the refrigerating drier 6.

After reaching a preadjustable inner temperature of the refrigerating drier 6 to be defrosted the control device 24 opens sealing flap 37 and closes sealing flap 33 of the refrigerating drier 6, so that the air saturated with water on defrosting at a specific temperature cannot be drawn in by the refrigerant compressor 23.

Time is available for the defrosting phase of the refrigerating drier 6 or 5, until the heat exchanger 16 or 15 used to overcool the drawn in gas 2 is so iced up that the cooling effect necessary for overcooling the suctioned gas 2 is no longer sufficient.

Furthermore, a bypass line 85 is assigned to the refrigerant compressor 23 which extends between the suction line 57 and the line 61. In this bypass line 85 an excess pressure and a low pressure control valve 86 are provided in order to prevent the refrigerant compressor 23 from getting damaged. Because of the small amount of hot gaseous refrigerant 68 required to defrost the heat exchangers 15 or 16 respectively, the through-flow cross section of the return lines 38 and 39 is much smaller than the cross section of connection lines 17 and 18. With the inflow of the liquid refrigerant 68 into the connection line 17 or 18, in which the level of pressure is lowered by the expansion valves 27 or 28 to the desired value, there is also an expansion of the liquid refrigerant 68 supplied by the return line 39 or 38. The precise control and maintenance of the desired pressure and temperature conditions in the suction lines 19 and 20 of the respective heat exchanger 15 or 16 used to cool the suctioned gas 2 is ensured in that the changing conditions, in particular the temperature of the liquid refrigerant 68, which is supplied through the return line 38 or 39 are compensated by adjustments and regulations of the expansion valve 27 or 28 in simplex operation.

Of course, it is also possible that after defrosting the refrigerant 68 can return via the return lines 38, 39, but before the respective expansion valves 27, 28 of the heat exchanger 15, 16 used for cooling, into the pressure lines 25, 26. It only has to be ensured that in the supply region of refrigerant 68 coming from the heat exchanger 16 or 15 to be defrosted the pressure in said refrigerant 68 is higher than in the pressure lines 25 or 26. If this cannot be ensured in every operational state the supply is possible via a Venturi nozzle arrangement for example or the like.

Before the refrigerating drier 6 is put into operation again, i.e. before the defrost phase is completed, the refrigerating drier 6 is pre-cooled. Here the solenoid valve 49 is opened by the control device 24. Thus the liquid refrigerant 68 passes from the refrigerant compressor 23 to the expansion valve 28 by which the temperature to which the inner chamber of the refrigerating drier 6 is to be cooled is determined by the control device 24. Once the refrigerating drier 6 has been pre-cooled to the corresponding temperature if the refrigerating drier 5 is too heavily iced-up the suction process for the gas 2 can be performed by the refrigerating drier 6. Furthermore, after pre-cooling is completed sealing flap 33 of the refrigerating drier 6 and sealing flap 37 can be closed by the control device 24.

Of course, a design of the device 1 shown in FIGS. 1 to 3 is also possible without using the three sealing flaps 33 and 37, whereby the gas 2 to be compressed by the compressor 4 is suctioned into each refrigerating drier 5 or 6 independently.

In FIG. 4 a temperature path for the internal temperature in refrigerating drier 5 or 6 is shown in which the x-axis indicates the time t in minutes and the y-axis the temperature T in ° C. The characteristic curve 87 drawn in a solid line corresponds to the temperature path in the refrigerating drier 5 and the characteristic curve 88 drawn in a dash-dot line corresponds to the temperature path in refrigerating drier 6.

As described above the refrigerating driers 5 and 6 are operated in different ways, i.e. refrigerating drier 5, as characteristic curve 87 shows, is switched from cooling mode to defrosting mode and refrigerating drier 6 from defrosting mode to cooling mode. At time point 89 the defrost cycle for heat exchanger 16 is ended and refrigerating drier 6 is pre-cooled by the control device 24 as described with reference to FIGS. 2 and 3. At time point 90 the inner chamber of refrigerating drier 6 is cooled to the temperature set by the control device 24 and it is possible to switch from refrigerating drier 5 to refrigerating drier 6. However, it is also possible to maintain this state of pre-cooling for a longer period if refrigerating drier 5 is not too heavily iced-up.

Once the defrost cycle has been commenced for the refrigerating drier 5 by the control device 24, as occurs at time point 90, the hot gaseous refrigerant 68 flows through the heat exchanger 15 of refrigerating drier 5, whereby the temperature in the inner chamber of the refrigerating drier 5 begins to rise. At the same time as the commencement of the defrost cycle for refrigerating drier 5 the cooling cycle is started for refrigerating drier 6. This is shown in turn at time point 90. Furthermore, it is possible to perform the pre-cooling phase at the corresponding temperature of the refrigerating drier 5 in order to ensure a rapid, low loss switching from refrigerating drier 5 to refrigerating drier 6. At time point 91 the refrigerating drier 6 has reached the temperature set by the control device 24 and can cool the suctioned gas 2 accordingly.

By flowing the hot gaseous refrigerant 68 into the heat exchanger 15 of the refrigerating drier 5 the inner temperature in the refrigerating drier 5 increases further. At time point 92 the inner temperature of the refrigerating drier 5 reaches the maximum value at which the ice begins to melt. At time point 93 the defrosting process is completed for refrigerating drier 5 and the control device 24 controls the device 1 so that the refrigerating drier 5 is pre-cooled and thus the position of the time point is obtained as previously for refrigerating drier 6 whereupon the following time points 91 to 93 are repeated.

This state can now be maintained over several periods if the refrigerating drier 6 is still not too iced-up. At time point 90 it is established in refrigerating drier 6 by a temperature sensor 94, which is shown in FIG. 1, that the desired cooling temperature for the suctioned gas 2 is no longer being reached, and the control device 24 then switches the refrigerating drier 6 to defrosting mode and at the same time activates the refrigerating drier 5 for the cooling of the suctioned gas 2, whereby the refrigerating drier 5 is operated in cooling mode and the refrigerating drier 6 in defrosting mode.

FIG. 5 shows a possible design variant of the device 1 according to the invention for compressing gases 2 which are indicated schematically by arrows 3. Here the same reference numbers are used for parts which correspond to parts of the previously described embodiments. Here the gas 2 is suctioned by the compressor 4 over the suction points 34 of the respective refrigerating drier 5, 6 and cooled therein.

The difference from the design variant described in FIG. 1 is that in each of the two refrigerating driers 5, 6 two heat exchangers 95, 15 or 96, 16 are arranged behind one another in the direction of flow. Whilst the heat exchangers 15, 16 in the previously described manner are driven by the refrigerant circuit, comprising the refrigerant compressor 23, various solenoid valves 21, 31, 32 and expansion valves 27, 28, a separate refrigerant circuit is provided for the additional heat exchangers 95, 96. Thus each input of the heat exchangers 95, 96 is connected by its own connection line 97, 98 with the interconnection of an expansion valve 99, 100 to the output of its own condenser 59 for this refrigerant circuit, which is connected downstream of an additional refrigerant compressor 23. The suction point of the refrigerant compressor 23 is connected by the suction line 57 with the interconnection of solenoid valves 101, 102 to the suction lines 103, 104 connected downstream of the heat exchangers 95, 96 in the direction of flow. The expansion valves 99, 100 and the solenoid valves 101, 102 are in turn connected by control lines 105 to 108 to the control device 24.

In this illustrated embodiment no possibility is provided in the refrigerant circuit for the heat exchangers 95, 96 to supply one of the two heat exchangers 95, 96 optionally with hot, gaseous refrigerant 68 for defrosting. Rather with the alternate defrosting of the heat exchangers 15, 95 or 16, 96 there is only a corresponding heating of the heat exchanger 15 or 16 with hot, gaseous refrigerant 68, as described in detail with reference to FIGS. 2 and 3 and by heating the heat exchangers 15 or 16 the ice is also defrosted on the heat exchangers 95, 96. If the heat output of the heat exchangers 15 or 16 is not sufficient to defrost the refrigerating driers 5 or 6 it is of course also possible to design the refrigerant circuit of the heat exchangers 95, 96 so that the corresponding return lines 38, 39 and the solenoid valves 31, 32 required therefor are also incorporated therein so that each of the two heat exchangers 95, 96 can be defrosted by the supply of hot, gaseous refrigerant 68 in the same way as the heat exchangers 15, 16.

Of course, it would be possible to provide a joint refrigerant compressor 23 instead of two separate refrigerant compressors 23 for the heat exchangers 15, 16 or 95, 96. Because of the greater operational reliability and the lower cost of refrigerant compressors 23 with smaller capacity it is recommended to use a separate refrigerant compressor 23 for each of these refrigerant circuits. This has the advantage that if one refrigerant compressor 23 fails at least a proportion of the cooling required for the suctioned gas 2 is possible and the device 1 according to the invention can continue to be operated albeit with a lesser degree of efficiency.

The method for compressing gases 2 according to the present embodiment is as follows:

The gas 2 to be compressed in the device 1 shown is suctioned into the refrigerating drier 6, for example via the refrigerating drier 6, i.e. via the suction point 34 of the opened sealing flap 33 of the refrigerating drier 6. The suctioned gas 2 then passes through the heat exchanger 96 in which the suctioned gas 2 is pre-cooled. Afterwards, the suctioned gas 2 passes through the heat exchanger 16 and is cooled thereby to the desired temperature and reaches the compressor 4 via the suction line 8 and the opened sealing flap 13.

If the gas 2 suctioned by the heat exchangers 16 and 96 is cooled the expansion valves 28 and 100 and the solenoid valves 21 and 102 are controlled by the control device 24. In this way, the cold, gaseous refrigerant 68 can flow via the connection line 18 and 98 into the heat exchanger 16 and 96, whereby the gas 2 is cooled on the inside of the refrigerating drier 6.

Simultaneously, with the activation of the expansion valves 28 and 100 the solenoid valve 21 and 102 is controlled by the control device 24 via the control lines 45 and 107, whereby the cold, gaseous refrigerant 68 can flow from the heat exchanger 16 and 96 via the suction lines 20 and 104 to the suction lines 22 and 57 and to the refrigerant compressors 23.

The cooling of the suctioned gas 2 is performed now in the two heat exchangers 16 and 96. The two heat exchangers 16 and 96 are operated within different temperature ranges, i.e. heat exchanger 96 has a temperature of e.g. −10° and heat exchanger 16 has a temperature of e.g. −20° C., whereby the suctioned gas 2 is pre-cooled on flowing through the heat exchanger 96 and is finally cooled by heat exchanger 16 to the prescribed temperature. This has the advantage that the suctioned gas 2 can be cooled to a lower temperature whereby it is ensured that the condensate contained in the gas 2 is separated.

By cooling the gas 2 in the refrigerating drier 6, as already explained in connection with the previously described figures, on cooling the gas 2 to below 0° C. ice is formed inside the refrigerating drier 6 or 5, whereby the refrigerating driers 5, 6 have to be defrosted alternately. Here, as shown in refrigerating drier 5, the sealing flap 12 is closed, so that the compressor 4 cannot suction any gas 2 through the refrigerating drier 5. Simultaneously with the closing of sealing flap 12 the control device 24 triggers the solenoid valve 31, whereby hot, gaseous refrigerant 68 passes through the bypass line 29 into the connection line 17 from the refrigerant compressor 23 and thus the heat exchanger 15 is heated. The heated refrigerant 68 flows in turn from the output of the heat exchanger 15, as explained in detail in FIG. 3, via the check valve 40 and the return line 38 to the input of heat exchanger 16 and there is fed into the connection line 18 so that it mixes with the cold gaseous refrigerant 68 and the refrigerant circuit is closed.

On flowing hot refrigerant 68 through the heat exchanger 15, the heat exchanger 15 heats up, whereby the ice on the heat exchanger 15 and on the walls of the refrigerating drier 5 is defrosted. Simultaneously, an accumulation of heat builds up in the refrigerating drier 5 whereby the heat exchanger 95 is also defrosted and thus ice flows out of the outflow 36 in the form of water.

In FIG. 6. a different embodiment of the solution according to the invention is shown in which for reasons of clarity only one of the previously described refrigerating driers 5, 6, namely refrigerating drier 5, is shown. The function and interconnection of the shown refrigerating drier 5 with the not shown refrigerating drier 6 can be ascertained from the previously described FIGS. 1 to 5. Furthermore, the same reference numbers are used for those parts which correspond with the parts in the previously described Figs. On using the refrigerating drier 5 shown usually, but not necessarily, refrigerating drier 6 is also identical in design.

The shown refrigerating drier 5 for suctioning gases 2 for the compressor 4 differs from those in the previously described embodiments in that there is a climatic zone 109 and a cooling zone 110. The climatic zone 109 comprises three heat exchangers 111 to 113, whilst the cooling zone 110 comprises four heat exchangers 114 to 117. Each of the heat exchangers 111 to 113 and 114 to 117 comprises a through pipe coil or pipe spiral, over which the suctioned air to be cooled flows. In the layout and arrangement of the individual pipe coils of the individual heat exchangers 111 to 113 and 114 to 117 it should be ensured that the latter are of equal length and come into contact with approximately the same amount of suctioned air so that the emittance of heat is almost equal over the length of each of these heat exchangers 111 to 117 and so that no difference in pressure can build up in the individual heat exchangers 111 to 117 between their input and output.

The heat exchangers 111 to 113 of the climatic zone 109 and the heat exchangers 114 to 117 of the cooling zone 110 are in turn connected by pressure lines 118 to 124 with the interconnection of expansion valves 125 to 131 and connection lines 17, 18. Furthermore, pressure lines 118 to 124 are connected to one or several refrigerant compressors 23 which are not shown for reasons of clarity. The outputs of the heat exchangers 111 to 117 are connected via suction lines 132 to 138 with the interconnection of solenoid valves 139 to 145 to one or several refrigerant compressors 23, whereby the refrigerant circuit is closed for the refrigerant 68.

Furthermore, the refrigerant compressors 23 are connected by bypass lines 146 to 152 with the interconnection of a solenoid valve 153 to 159 to connection lines 17, 18 and between the expansion valves 125 to 131 and the heat exchangers 111 to 117.

In FIG. 6 the return lines 160 to 166 are also shown schematically which are connected between the expansion valves 125 to 131 and the heat exchangers 111 to 117. Said return lines 160 to 166 are connected to the output of the heat exchangers in refrigerating drier 6 with the interconnection of a check valve. At the output of the heat exchangers 111 to 117 further return lines 167 to 173 are connected to the suction lines 132 to 138, upstream of the solenoid valves 139 to 145. The ends of the return lines 167 to 173 are connected to the corresponding inputs of the heat exchanger to the refrigerating drier 6 with the interconnection of a check valve 174 to 180.

By means of the connection of the refrigerating drier 5, 6, via the return lines 160 to 173 the device 1 can be operated as explained in the previously described figures.

Furthermore, it should be noted that an equal number of heat exchangers 111 to 117 can be arranged both in the climatic zone 109 and in the cooling zone 110. Of course, it is possible that the individual heat exchangers 111 to 117 can be operated both individually and in parallel or together with the control device 24.

If the heat exchangers 111 to 117 are driven individually by the control device 24 it is possible to determine the inner temperature of the refrigerating drier 5, 6 by the number of active heat exchangers 111 to 117 without the amount of refrigerant 68 to be expanded having to be controlled. Of course, it is possible that any number of heat exchangers 15, 16 are used in the individual refrigerating driers 5, 6, FIG. 7 shows a different design variant of the solution according to the invention as described in FIG. 6. For reasons of clarity only one refrigerating drier 5 or 6, namely refrigerating drier 5 is shown. The function and the interconnection of the shown refrigerating drier 5 with the not shown refrigerating drier 6 can be selected according to any of the previously described embodiments in FIGS. 1 to 6. Furthermore, the same reference numbers are used for those parts which correspond to the parts in the previously described figures. On using the shown refrigerating drier 5 usually, but not necessarily, refrigerating drier 6 is designed to be identical and usually two refrigerating driers 5, 6 are arranged in parallel which are operated alternately. The advantages can however also be obtained by using only one refrigerating drier 5 or 6.

The difference from the design variant shown in FIG. 6 is that several heat exchangers 114 to 116 are arranged in the cooling zone 110 which are however only supplied with gaseous refrigerant 68 via a single, joint connection line 17. The connection line 17, as in the previously described embodiments, is connected to a refrigerant compressor 23 via an expansion valve 125 with a pressure line 119. The output of the heat exchangers 114 to 116 is in turn connected to the refrigerant compressor 23 by a suction line 132 with the interconnection of a solenoid valve 139, whereby the refrigerant circuit for cooling the suctioned gas 2 is closed. The supply lines for the heat exchangers 114 to 116 are thus connected to the connection line 17 or the suction line 132 before entering into the refrigerating drier 5. In this embodiment it should be ensured that the line length of the individual heat exchangers 114 to 117 and the line diameter of the heat exchangers 114 to 117 are of equal size. In this way a pressure difference should be prevented from being created between the individual heat exchangers 114 to 117 as otherwise the gaseous refrigerant 68 seeks a path of least resistance through the heat exchangers 114 or 117. As a result the other heat exchangers 114 to 117 are not flowed through with the same amount of gaseous refrigerant 68, which would result in a reduction in performance. Furthermore, in FIG. 7 a bypass line is also shown with a solenoid valve 153, which, as described in FIG. 6, is connected to the refrigerant compressor 23. Said bypass line 146 is connected to the connection line 17 between the expansion valve 125 and the intersection of the individual connection lines for the heat exchangers 114 to 117, whereby a defrosting of the heat exchangers 114 to 117 is possible.

The climatic zone 109 in this embodiment is also formed from several individual heat exchangers 111 to 113, which in turn are connected by a single connection line 18 to the expansion valve 129. The expansion valve 129 is in turn connected by a pressure line 118 to the same refrigerant compressor 23 or a further refrigerant compressor 23. The output of the heat exchangers 111 to 113 is connected to the same refrigerant compressor 23 which supplies the pressure line 118 by means of a suction line 136 with the interconnection of solenoid valve 143. The supply lines of the individual heat exchangers 111 to 113 are split outside the refrigerating drier 5, so that the refrigerant can flow from the connection line 18 into the individual heat exchangers 111 to 113. Here too it should be noted, as already described, that the line length and the diameter of the lines of the individual heat exchangers 111 to 113 are equal in size in order to avoid differences in pressure between the individual heat exchangers 111 to 113. The climatic zone 109 can for example also be connected to the connection line 18 by a bypass line 150 with the interconnection of a solenoid valve 157, whereby a defrosting of the climatic zone 109 is possible with the supply of hot refrigerant gas through the bypass line 150.

Furthermore, the refrigerating drier 5, as described in FIG. 6, comprises the return lines 160, 164, 167 and 168 for interconnection with refrigerating drier 6, whereby the defrosting process can be used, as in the previously described FIGS. 1 to 6.

In FIG. 8 a different design variant is shown which is similar to the embodiment described previously with reference to FIGS. 6 and 7. Again for reasons of clarity only one of the two refrigerating driers 5, 6 is shown, namely refrigerating drier 5. The function and interconnection of the shown refrigerating drier 5 with the not shown refrigerating drier 6 can be taken from the previously described FIGS. 1 to 7. Furthermore, the same reference numbers are used for those parts which correspond to parts in the previously described Figs. On using the shown refrigerating drier 5 usually, but not necessarily, refrigerating drier 6 is identical in design.

In this design variant the climatic zone 110 is formed from only one heat exchanger 114. However, it is also possible for several heat exchangers 114 to be used. The heat exchanger 114 is then formed from several refrigerant lines 181 to 184 whereby the individual refrigerant lines 181 to 184 in turn are connected outside the refrigerating drier 5 to the connection line 17. Here it should be ensured that the cross section of the line and the length of the individual refrigerant lines 181 to 184 are of equal size, in order, as already described, to prevent differences in pressure. Of course, on using several heat exchangers 114 the refrigerant lines 181 to 184 in the individual heat exchangers 114 can be different, if the latter are controlled by their own expansion valve 125.

The connection line 17 is in turn connected to the pressure line 119 via the expansion valve 125. The pressure line 119 is connected to the refrigerant compressors 23 as in the previously described Figs. The output of the heat exchanger 114 is in turn connected via a suction line 132 with the interconnection of a solenoid valve 139 to the refrigerant compressor 23 which is connected to the pressure line 1119. The individual refrigerant lines 181 to 184 are here connected between the solenoid valve 139 and the input or the output of the heat exchanger 114 to the suction line 132.

In order now to defrost the heat exchanger 114, a bypass line 146 is connected by the refrigerant compressor 23 to the connection line 17 with the interconnection of a solenoid valve 153, between the expansion valve 125 and the division of the connection line 17 into the individual refrigerant lines 181 to 184.

In the climatic zone 109 a different embodiment of a heat exchanger 111 is shown. The heat exchanger comprises three refrigerant lines 185 to 187. The refrigerant lines 185 to 187 are connected respectively to an expansion valve 129 to 131 via the connection line 18, whereby the individual refrigerant lines 185 to 187 can have different lengths and diameters of different sizes as with the pre-arrangement of the expansion valves 129 to 131 a precise through-flow of the refrigerant 68 through the refrigerant lines 185 to 187 can be controlled by the control device 24. The expansion valves 129 to 131 are here connected to one or several refrigerant compressors 23 by the pressure line 118.

At the output of the heat exchanger 111 the refrigerant lines 185 to 187 are connected to the solenoid valves 143 to 145. Afterwards, the outputs of the solenoid valves 143 to 145 are connected to the suction line 136 which is in turn connected with the refrigerant compressor 23.

At the same time e.g. each refrigerant line 185 to 187 has its own bypass line 150 to 152 with interconnected solenoid valves 157 to 159, by means of which the climatic zone 109 can also be defrosted. Furthermore, the individual connection lines 17, 18 and the refrigerant lines 185 to 187 are connected to the return lines 160, 164 to 166, 167, 171 to 173, whereby the previously described process can be applied.

FIG. 9 shows a modified design variant of the device 1 described in FIGS. 2 and 3 and therefore the same reference numbers are used for the same parts as in FIGS. 2 and 3.

The difference from the design variant described in FIGS. 2 and 3 is that in the device 1 the return lines 38, 39 leading away from the refrigerating driers 5, 6 are connected via a Venturi valve 188, 189 to the pressure lines 25, 26. That is the return lines 38, 39 no longer enter into the connection lines 17, 18 but are arranged between the expansion valves 27, 28 and the solenoid valves 48, 49. It is however also possible as shown in dashed lines that the return lines 38, 39 are connected to the pressure line 66 upstream of the solenoid valves 48, 49.

With the connection of the return lines 38, 39 to the pressure lines 25, 26 and pressure line 66 it is necessary to arrange the Venturi valve 188, 189, as the pressure in the pressure lines 25, 26 is much higher than the pressure in the return lines 38, 39. By the arrangement of the Venturi valves 188, 189 an area of low pressure is created in the return lines 38, 39, through which the liquid refrigerant 68, which on defrosting the refrigerating driers 5, 6 exits at the output of the heat exchangers 15, 16, is suctioned into the pressure lines 25, 26. The defrosting of the heat exchangers 15, 16 and the cooling of the suctioned gas 2 is performed as described in FIGS. 1 or 5.

Furthermore, at the refrigerant compressor 23 the pressure of the gaseous refrigerant 68 in the suction line 57 is detected directly at the input by a pressure gauge device 190. Simultaneously however, at the output of the refrigerant compressor 23 the pressure in the line 61 of the compressed gaseous refrigerant 68 can also be detected by a pressure gauge device 191. If the pressure difference between the input and the output of the refrigerant compressor 23 is too high the control device 24 can identify a leaking point in the line system of the device 1 and if necessary switch off the device 1. This safety switching prevents the refrigerant compressor 23 drawing in gases 2 from the atmosphere which are saturated with water, whereby water impact on the refrigerant compressor 23 is prevented.

Of course, the pressure gauge devices 190 and 191 can be arranged at any other point of the line system of the device 1. The advantage of the arrangement of the pressure gauge devices 190, 191 directly on the refrigerant compressor 23 is that the pressure of the refrigerant 68 is changed slightly by the line system and thus if it is arranged at any different point of the line system a false measurement could occur.

Furthermore, in FIG. 9 a different embodiment of the return of the refrigerant 68 is shown. This variant comprises snifter lines 192, 193 which are indicated by a dash-dot line. The snifter lines 192, 193 are connected to suction line 19, 20 and the additional suction line 22, whereby the solenoid valves 21 are bridged in the suction lines 19, 20. In this embodiment return lines 38, 39 are not necessary, as the cooled liquid refrigerant 68 which is used to defrost the refrigerating drier 5, 6 can now flow through the snifter lines 192, 193 directly into the suction line 22. By means of the pressure difference in the suction line 22 and in the snifter line 192 or 193 the liquid refrigerant 68 becomes gaseous again and can thus be suctioned by the refrigerant compressor 23 without water impact occurring on the refrigerant compressor 23.

In FIG. 10 a compressed air arrangement 194 is shown. The compressed air arrangement 194 comprises several individual devices 195 to 197 in which the designs of the individual devices 195 to 197 can correspond to the devices 1 previously described in FIGS. 1 to 7. The devices 195 to 197 are connected by collective lines 198 to a compressed air tank 199. Users 201 are connected to the compressed air tank 199 by hoses 200 which for example can be in the form of blow guns 202 or gas or oil burners in power stations or other compressed air users.

A central control unit 203 is connected by a bus system 204 to the individual control elements 205, whereby each device 195 to 197 can have several control elements 205 which control the functions of the individual devices 195 to 197, as in the previously described Figs. Furthermore, control elements 205 are arranged on the compressors 4 of the devices 195 to 197 and on the compressed air tank 199 in order to control or regulate the switching on and off of the device 195 to 197 and the pressure in the compressed air tank 199 by the central control unit 203.

If the compressed air arrangement 194 is operated the central control unit 203 checks the volume or the pressure of the compressed air in the compressed air tank 199 by the bus system 204 and the control element 205 of the compressed air tank 199 and simultaneously measures the consumption of compressed air 206 by the user 201 at the output of the compressed air tank 199. Once the central control unit 203 has detected the pressure or the volume of compressed air in the compressed air tank 199 and the consumption 201 of compressed air 206, the central control unit 203 activates the individual devices 195 to 197 via the bus system 204, i.e. with the maximum use of compressed air 206 the central control unit 203 switches on all devices 195 to 197. However, if less compressed air 206 is used the central control unit 203 can activate the devices 195 to 197 individually, whereby the volume of the gas 2 suctioned by the individual devices 195 to 197 can be controlled.

It is also possible to connect together various devices 195 to 197 with different capacities in the compressed air arrangement 194, whereby a control of the consumption or the compressed air 206 to be produced can be regulated more precisely, as by grading the devices 195 to 197 it is possible to make a precise adjustment to the consumption of compressed air 206 by the user 201.

If the central control unit 203 establishes for example that less compressed air 206 is needed by the user 201 the pressure in the compressed air tank 199 rises, whereby the central control unit 203 switches off one of the devices 195 to 197, e.g. device 195 and thereby less compressed air is produced, whereby the amount of compressed air 206 produced is adjusted to the consumption of the user 201. If however more compressed air 206 is required by the user 201 the pressure of the compressed air 206 in the compressed air tank 199 falls, whereby the central control unit 203 detects the drop in pressure via the control element 205 and afterwards reactivates device 195 again via the bus system 204.

An advantage of this design of the compressed air arrangement 194 is that several devices 195 to 197 of different constructions and different capacities can be used whereby a rapid and precise adjustment of the consumption of compressed air to the production of compressed air 206 is made possible.

Of course, it is also possible that the devices 195 to 197 each have their own control device 24, whereby each device 195 to 197 is controlled by its own control device 24. Furthermore, it is also possible that the central control unit 203 cooperates via bus system 204 with several off-centre control devices 24, which are assigned to the individual devices 195 to 197. The off-centre control devices 24 then take over control of the devices 195 to 197 and only the higher control functions, for example, establishing how many of the devices 195 to 197 are being operated or the central detection of the output data and the visualisation of the operating states of the individual devices 195 to 197 or the entire system in real-time or the necessary evaluations therefor. Of course, the central control unit 203 can also be formed by corresponding microprocessors, for example conventional personal computers with graphics terminals or the like.

Furthermore, a suction device 207 is shown in FIG. 10 for drawing in gas 2. This suction device 207 can be used for all the above-mentioned embodiments of FIGS. 1 to 9.

The suction device 207 has two openings 208, 209 for drawing in the gas 2 whereby opening 208 leads directly into the refrigerating drier 5 and the other opening 209 leads into the refrigerating drier 5 via a particle filter 210. The openings 208, 209 can thus be opened or closed by the central control unit 203 by controlling sealing flaps 211, 212 in the lines, i.e. on activating sealing flap 211 and sealing flap 33 the opening 208 is activated and on activating sealing flap 212 with sealing flap 33 the gas 2 is suctioned through the particle filter 210. This has the advantage that the particles of dirt contained in the gas 2 are filtered out in the particle filter 210. The particle filter must be activated when the suctioned gas 2 contains too little moisture or water, in order to wet the surfaces of the heat exchangers so that the particles of dirt are separated independently. This is relevant if the gas 2 has a low temperature compared to the planned suction temperature, e.g. in winter.

Furthermore, FIG. 11 shows a different embodiment of the compressed air arrangement 194 shown in FIG. 10, in which the same reference numbers are used for the same parts.

The difference from the compressed air arrangement 194 shown in FIG. 10 is that the compressors 4 for suctioning the gas 2 no longer suction, as described in FIG. 10, via the refrigerating driers 5, 6, but the compressors 4 firstly draw gas 2 from the atmosphere, compress it and finally cool it to a specific temperature via the refrigerating driers 5, 6. Furthermore, the water vapour contained in the atmosphere or in the gas 2 is removed in the refrigerating driers 5, 6. The cooled air is then conveyed further by the individual devices 195 to 197 into the compressed air tank 199 from where it can be directed to the user 201.

It is also possible, that the devices 195 to 197 are arranged both on the suction side of the compressors 4 and on the pressure side of the compressors 4.

Of course, it is also possible to arrange only one refrigerating drier 5 or 6 after a compressor 4 for gas 2 and not several parallel connected devices with several parallel connected compressors 4, as shown in FIG. 1.

In this way, it is also possible to use the refrigerating drier 5, 6 according to the invention in smaller installations not only in the suction region, i.e. before the compressor 4 but also in the pressure region after the output of the compressor 4.

The advantages of the present invention and the measures described therein can be obtained in very different types of compressors for gases 2, for example in screw compressors, piston compressors, radial compressors or the like.

To illustrate the essential function of the devices 1 according to invention and the compressed air arrangement 194 simplified circuit symbols are used and furthermore parts not essential to the function, such as throttle valves and other components are omitted, their arrangement being part of the specialist knowledge of one skilled in the art, e.g. a refrigerating technician. Any individual elements known from the prior art can be used as individual components, in particular for the expansion valves 27, 28, 99, 100, refrigerant compressors, condensers and heat exchangers.

In FIG. 12 a further embodiment of the solution according to the invention is shown. For reasons of clarity again only one refrigerating drier 5 or 6 is illustrated, namely refrigerating drier 5, whereby the same reference numbers are used for the same parts contained in the previously described FIGS. 1 to 11.

The function and the interconnection of the shown refrigerating drier 5 with the not shown refrigerating drier 6 can be selected from any of the previously described embodiments of FIGS. 1 to 11. On using the shown refrigerating drier 5, usually but not necessarily, refrigerating drier 6 is identical in design and usually two refrigerating driers 5, 6 are arranged in parallel which are operated alternately.

The difference from embodiments shown in the previously described FIGS. 1 to 11 is that the refrigerating drier 5 is formed from several zones, in particular cooling zone 110 and climatic zone 109 and an intermediate zone 213 arranged between the cooling zone 110 and the climatic zone 109. Several heat exchangers 214 to 216 are arranged in the cooling zone 110. The heat exchangers 214 to 216 are arranged preferably vertically above one another in the direction of flow of the suctioned gas 2. The heat exchangers 214 to 216 in the intermediate zone 213 and the climatic zone 109 are arranged in the same way. An advantage of this arrangement of the heat exchangers 214 to 216 is that an improved cooling of the gas 2 is obtained on flowing the gas 2 over a larger area. By arranging the heat exchangers 214 to 216 in the individual zones behind one another in the direction of flow, it is also achieved that there is an evenly increasing cooling of the gas 2 in the refrigerating drier 5 between the suction point 34 and outlet 10, so that on the inside of the refrigerating drier 5 between the individual zones no great differences in temperature can occur.

The heat exchangers 214 to 216 can be controlled for example as in FIG. 7. It is of course possible that each of the other design variants of the previously described FIGS. 1 to 11 can be used to drive the heat exchangers 214 to 216. Furthermore, it is possible that parallel to the individual heat exchangers 214 to 216 additional heat exchangers 214 to 216 are arranged in the same plane so that distributed over the cross sectional area of the refrigerating drier 5 several heat exchangers 214 to 216 are arranged in a plane vertical to the direction of flow or in several planes behind one another in the direction of flow.

A further advantage of this illustrated design variant is that by the arrangement of the intermediate zone 213 the intermediate region between the cooling zone 110 and the climatic zone 109 can be used as an additional cooling stage, so that now there are three different zones with different temperatures in the refrigerating drier 5. Of course, it is also possible that further individual zones are arranged in the refrigerating drier 5 so that a finer adjustment of temperature from the climatic zone 109 to cooling zone 110 is achieved.

The control of the intermediate zone 213 corresponds to the drive of the cooling zone 110, as described in FIG. 7, whereby the same reference numbers are used for the intermediate zone 213, as used in FIG. 7. Furthermore, it should be mentioned that the individual heat exchangers 214 to 216 can be controlled separately.

For forms sake it should be noted that individual parts of the previously described installations or devices can also form the subject matter of independent solutions according to the invention in any combination.

List of Reference Numbers

| | | | |
|---|---|---|---|
| 1 | device | 41 | check valve |
| 2 | gas | 42 | control line |
| 3 | arrow | 43 | control line |
| 4 | compressor | 44 | control line |
| 5 | refrigerating drier | 45 | control line |
| 6 | refrigerating drier | 46 | control line |
| 7 | suction line | 47 | control line |
| 8 | suction line | 48 | solenoid valve |
| 9 | suction line | 49 | solenoid valve |
| 10 | outlet | 50 | pressure sensor |
| 11 | outlet | 51 | pressure sensor |
| 12 | sealing flap | 52 | pressure line |
| 13 | sealing flap | 53 | pressure line |
| 14 | drive | 54 | temperature sensor |
| 15 | heat exchanger | 55 | temperature sensor |
| 16 | heat exchanger | 56 | heat exchanger |
| 17 | connection line | 57 | suction line |
| 18 | connection line | 58 | motor |
| 19 | suction line | 59 | condenser |
| 20 | suction line | 60 | cooling water circuit |
| 21 | solenoid valve | 61 | line |
| 22 | suction line | 62 | line |
| 23 | refrigerant compressor | 63 | input |
| 24 | control device | 64 | liquid converter |
| 25 | pressure line | 65 | output |
| 26 | pressure line | 66 | pressure line |
| 27 | expansion valve | 67 | sight glass |
| 28 | expansion valve | 68 | refrigerant |
| 29 | bypass line | 69 | hot gas regulator |
| 30 | bypass line | 70 | line |

List of Reference Numbers

| | | | |
|---|---|---|---|
| 31 | solenoid valve | 71 | pressure sensor |
| 32 | solenoid valve | 72 | pressure line |
| 33 | sealing flap | 73 | bypass line |
| 34 | suction point | 74 | drive |
| 35 | connection line | 75 | drive |
| 36 | outflow | 76 | control line |
| 37 | sealing flap | 77 | control line |
| 38 | return line | 78 | control line |
| 39 | return line | 79 | supply line |
| 40 | check valve | 80 | supply line |
| 81 | current source | 121 | pressure line |
| 82 | drive | 122 | pressure line |
| 83 | control line | 123 | pressure line |
| 84 | control line | 124 | pressure line |
| 85 | bypass line | 125 | expansion valve |
| 86 | excess and low pressure control valve | 126 | expansion valve |
| 87 | characteristic curve | 127 | expansion valve |
| 88 | characteristic curve | 128 | expansion valve |
| 89 | time point | 129 | expansion valve |
| 90 | time point | 130 | expansion valve |
| 91 | time point | 131 | expansion valve |
| 92 | time point | 132 | suction line |
| 93 | time point | 133 | suction line |
| 94 | temperature sensor | 134 | suction line |
| 95 | heat exchanger | 135 | suction line |
| 96 | heat exchanger | 136 | suction line |
| 97 | connection line | 137 | suction line |
| 98 | connection line | 138 | suction line |
| 99 | expansion valve | 139 | solenoid valve |
| 100 | expansion valve | 140 | solenoid valve |
| 101 | solenoid valve | 141 | solenoid valve |
| 102 | solenoid valve | 142 | solenoid valve |
| 103 | suction line | 143 | solenoid valve |
| 104 | suction line | 144 | solenoid valve |
| 105 | control line | 145 | solenoid valve |
| 106 | control line | 146 | bypass line |
| 107 | control line | 147 | bypass line |
| 108 | control line | 148 | bypass line |
| 109 | climatic zone | 149 | bypass line |
| 110 | cooling zone | 150 | bypass line |
| 111 | heat exchanger | 151 | bypass line |
| 112 | heat exchanger | 152 | bypass line |
| 113 | heat exchanger | 153 | solenoid valve |
| 114 | heat exchanger | 154 | solenoid valve |
| 115 | heat exchanger | 155 | solenoid valve |
| 116 | heat exchanger | 156 | solenoid valve |
| 117 | heat exchanger | 157 | solenoid valve |
| 118 | pressure line | 158 | solenoid valve |
| 119 | pressure line | 159 | solenoid valve |
| 120 | pressure line | 160 | return line |
| 161 | return line | 201 | user |
| 162 | return line | 202 | blow guns |
| 163 | return line | 203 | central control unit |
| 164 | return line | 204 | bus system |
| 165 | return line | 205 | control element |
| 166 | return line | 206 | compressed air |
| 167 | return line | 207 | suction device |
| 168 | return line | 208 | opening |
| 169 | return line | 209 | opening |
| 170 | return line | 210 | particle filter |
| 171 | return line | 211 | sealing flap |
| 172 | return line | 212 | sealing flap |
| 173 | return line | 213 | intermediate zone |
| 174 | check valve | 214 | heat exchanger |
| 175 | check valve | 215 | heat exchanger |
| 176 | check valve | 216 | heat exchanger |
| 177 | check valve | | |
| 178 | check valve | | |
| 179 | check valve | | |
| 180 | check valve | | |
| 181 | refrigerant line | | |
| 182 | refrigerant line | | |
| 183 | refrigerant line | | |
| 184 | refrigerant line | | |
| 185 | refrigerant line | | |
| 186 | refrigerant line | | |
| 187 | refrigerant line | | |
| 188 | Venturi valve | | |
| 189 | Venturi valve | | |
| 190 | pressure gauge device | | |
| 191 | pressure gauge device | | |
| 192 | snifter line | | |
| 193 | snifter line | | |
| 194 | compressed air arrangement | | |
| 195 | device | | |
| 196 | device | | |
| 197 | device | | |
| 198 | collective line | | |
| 199 | compressed air tank | | |
| 200 | hose | | |

I claim:

1. A method of forming a cooled compressed gas in an apparatus having a plurality of refrigerating driers each including a heat exchanger over which the gas is passed and through which a cooled refrigerant is passed for cooling the gas to a temperature below 0° C., each of the heat exchangers being connected to a refrigerant compressor, and wherein condensed water tends to form and freeze on the heat exchangers when the refrigerating driers are cooling the gas, the method comprising:

connecting each of the refrigerating driers to a suction side of a gas compressor such that operation of the gas compressor causes gas to be drawn through each of the refrigerating driers and cooled prior to being compressed in the gas compressor;

operating the gas compressor so as to draw the gas through at least a first of the refrigerating driers which does not have substantial ice on its heat exchanger and cooling the gas by compressing gaseous refrigerant in the compressor, liquefying the compressed gaseous refrigerant in a condenser, expanding the compressed liquefied refrigerant to a first pressure in an expansion valve, and passing the expanded refrigerant via a supply line to an input of the heat exchanger of the first refrigerating drier, the refrigerant exiting from the heat exchanger into a return line;

simultaneously defrosting at least a second of the refrigerating driers by passing compressed gaseous refrigerant from the compressor through the heat exchanger of the second refrigerating drier to melt ice formed thereon, the refrigerant exiting the heat exchanger of the second refrigerating drier at a second pressure greater than the first pressure;

feeding the refrigerant emerging from the second refrigerating drier at the second pressure into the supply line between the expansion valve and the heat exchanger of the first refrigerating drier;

measuring the pressure and temperature of the refrigerant in the return line from the heat exchanger of the first refrigerating drier; and regulating the amount of refrigerant supplied from the expansion valve to the heat exchanger of the first refrigerating drier such that the measured temperature of the refrigerant in the return line exceeds a predetermined temperature which corresponds to the measured pressure of the refrigerant in the return line, whereby it is assured that the refrigerant in the return line is in a gaseous state by virtue of being overheated in the heat exchanger.

2. Device for cooling gases, comprising:

a gas compressor;

at least first and second refrigerating driers for the gas, each drier having at least one heat exchanger and being connected to a suction side of the gas compressor such that operation of the gas compressor causes gas to be drawn through the drier;

a refrigerant circuit which includes a refrigerant compressor having an output side connected to supply compressed refrigerant to a condenser, and at least first and second expansion valves connected between the condenser and inputs of the heat exchangers of the first and second driers, respectively, the input of each heat exchanger being connected to the corresponding expansion valve by a connection line and an output of each heat exchanger being connected by a suction line to a suction input of the refrigerant compressors;

first and second bypass lines connected between the output side of the refrigerant compressor to the connection lines of the heat exchangers of the first and second driers, respectively, each bypass line having a bypass valve operable for causing hot compressed refrigerant to bypass the condenser and expansion valve and flow to the input of the corresponding heat exchanger;

a first return line connected between the suction line of the first drier and the connection line of the second drier and a second return line connected between the suction line of the second drier and the connection line of the first drier, each return line having a valve operable for causing refrigerant to flow through the return line;

first and second pressure sensors arranged for measuring the pressure of refrigerant in the suction lines of the first and second driers, respectively;

first and second temperature sensors arranged for measuring the temperature of refrigerant in the suction lines of the first and second driers, respectively;

whereby ice on one of the heat exchangers to be defrosted is melted by operating the corresponding bypass valve to cause hot compressed refrigerant to flow through the heat exchanger to be defrosted and by operating the valve in the corresponding return line to cause refrigerant exiting the heat exchanger to be defrosted to flow through the return line to the connection line of the other heat exchanger, the expansion valve (27, 28, 125 to 131) for the other heat exchanger being pressurised to alter the amount of refrigerant (68) passing through to the other heat exchanger (15, 16, 95, 96, 111 to 117), so as to maintain the actual temperature of the refrigerant in the suction line leading from the other heat exchanger a preset amount over a corresponding plan temperature.

3. Device according to claim 2, characterised in that each suction line (19, 20, 132 to 138) is connected by a pressure line (52, 53) to the corresponding pressure sensor (50, 51) and temperature sensor (54, 55).

4. Device according to claim 2, wherein each of the pressure sensors (50, 51) is connected to the corresponding expansion valve (27, 28, 125 to 131).

5. Device according to claim 2, characterised in that the expansion valve (27, 28, 125 to 131) increases the expansion of the refrigerant (68), when at the existing nominal pressure the actual temperature rises above a corresponding plan temperature which is desired to be produced at the nominal pressure.

6. Device according to claim 2, characterised in that the temperature of the refrigerant (68) emerging from the heat exchanger (15, 16, 95, 96, 111 to 117) to be defrosted is higher than +5° C.

7. Device according to claim 2, wherein the first and second refrigerating driers (5, 6) are connected in series to the suction side of the gas compressor such that gas first flows through the first refrigerating drier and then flows through the second refrigerating drier, the first refrigerating drier comprising a climatic zone (109) and the second refrigerating drier comprising a cooling zone (110).

8. Device according to claim 2, characterised in that each heat exchanger (15, 16, 95, 96, 111 to 117) has several refrigerant lines (181 to 187) running parallel to one another and in that the refrigerant lines (181 to 187) between the expansion valve (27, 28, 125 to 131) and the suction line (19, 20, 132 to 138) all have an equal length and an equal cross section.

9. Device according to claim 7, characterised in that the climatic zone (109) and the cooling zone (110) each includes several heat exchangers (15, 16, 95, 96, 111, to 117) connected parallel to one another and each fed with a separate expansion valve (27, 28, 125 to 131) by a common refrigerant compressor (23).

* * * * *

UNITED STATES PATENT AND TRADEMARK OFFICE
CERTIFICATE OF CORRECTION

PATENT NO. : 5,865,033

DATED : February 2, 1999

INVENTOR(S) : Gossler

It is certified that error appears in the above-identified patent and that said Letters Patent is hereby corrected as shown below:

On the title page, Item [30],

In the Foreign Application Priority Data, "1865/94" should read --1854/94--.

Signed and Sealed this

Eighth Day of June, 1999

Attest:

Q. TODD DICKINSON

Attesting Officer

Acting Commissioner of Patents and Trademarks